US010546395B2

(12) United States Patent
Yu et al.

(10) Patent No.: US 10,546,395 B2
(45) Date of Patent: Jan. 28, 2020

(54) XSLIT CAMERA

(71) Applicant: University of Delaware, Newark, DE (US)

(72) Inventors: Jingyi Yu, Newark, DE (US); Jinwei Ye, Elkton, MD (US); Yu Ji, Elkton, MD (US)

(73) Assignee: University of Delaware, Newark, DE (US)

( * ) Notice: Subject to any disclaimer, the term of this patent is extended or adjusted under 35 U.S.C. 154(b) by 459 days.

(21) Appl. No.: 15/026,768

(22) PCT Filed: Oct. 3, 2014

(86) PCT No.: PCT/US2014/059110
§ 371 (c)(1),
(2) Date: Apr. 1, 2016

(87) PCT Pub. No.: WO2015/051282
PCT Pub. Date: Apr. 9, 2015

(65) Prior Publication Data
US 2016/0253824 A1   Sep. 1, 2016

Related U.S. Application Data

(60) Provisional application No. 61/886,161, filed on Oct. 3, 2013.

(51) Int. Cl.
*G02B 5/20* (2006.01)
*H04N 5/225* (2006.01)
(Continued)

(52) U.S. Cl.
CPC ............ *G06T 11/003* (2013.01); *G06T 5/001* (2013.01); *H04N 5/2253* (2013.01); *H04N 5/2254* (2013.01); *H04N 13/204* (2018.05)

(58) Field of Classification Search
CPC ............................ G06T 11/003; H04N 5/2254
(Continued)

(56) References Cited

U.S. PATENT DOCUMENTS 6,639,596 B1   10/2003   Shum
6,993,074 B2   1/2006   Zhang
(Continued)

FOREIGN PATENT DOCUMENTS

CN   101060382 A   10/2007
CN   101296386 A   10/2008
CN   103163717 A   6/2013

OTHER PUBLICATIONS

Zomet, "Mosaicing New Views: The Crossed-Slits Projection", Jun. 2003, IEEE (Year: 2003).*

(Continued)

*Primary Examiner* — Albert Kir
(74) *Attorney, Agent, or Firm* — Kilpatrick Townsend & Stockton, LLP

(57) ABSTRACT

Light representing a scene is directed through a lens module coupled to an imaging sensor. The lens module includes: first and second cylindrical lenses positioned along an optical axis of the imaging sensor, and first and second slit-shaped apertures disposed on the respective first and second cylindrical lenses. A cylindrical axis of the second cylindrical lens is arranged at an angle away from parallel with respect to a cylindrical axis of the first cylindrical lens. The light directed through the lens module is captured by the imaging sensor to form at least one multi-perspective image. The at least one multi-perspective image is processed to determine a reconstruction characteristic of the scene.

8 Claims, 22 Drawing Sheets

(51) Int. Cl.
    *G06T 11/00*     (2006.01)
    *H04N 13/204*     (2018.01)
    *G06T 5/00*     (2006.01)
(58) Field of Classification Search
    USPC .......................................... 348/46; 359/642
    See application file for complete search history.

(56) References Cited

U.S. PATENT DOCUMENTS

| | | | |
|---|---|---|---|
| 8,548,269 | B2 | 10/2013 | Zargarpour |
| 9,661,303 | B2 | 5/2017 | Nagano |
| 2011/0043604 | A1 | 2/2011 | Peleg |

OTHER PUBLICATIONS

Ben-Ezra, "Multi-View Omni-Directional Imaging", Dec. 19, 2000 (Year: 2000).*
Notice of Reasons for Rejection for Japanese Application No. 2016-519816, dated Aug. 28, 2018; with translation, 8 pages.
Zomet, A., et al, "Mosaicing new views: the crossed-slits projection," Jun. 2003, pp. 741-754, vol. 25(6), IEEE Transactions on Pattern Analysis and Machine Intelligence.
Yu, J., et al., "General linear cameras," 2004, pp. 1-14, ECCV.
Seitz S., et al., "The space of all stereo images," 2002, pp. 21-38, vol. 48(1), International Journal of Computer Vision.
Pajdla, D., et al., "Epipolar geometry of some non-classical cameras," 2001, pp. 223-233, Proceedings of Computer Vision Winter Workshop, Slovenian Pattern Recognition Society.
Feldman, D., et al., "On the epipolar geometry of the crossed-slits projection," 2003, pp. 1-8, IEEE International Conference on Computer Vision 2003 2003.
Ye et al., "Manhatten Scene Understanding via XSlit Imaging", 2013 Conference on Computer vision and Pattern Recognition (CVPR), Jun. 23-28, 2013, pp. 81-88.
Roman et al., "Automatic Multiperspective Images", Eurographics Symposium on Rendering, 2006, 8 pages.
Raskar, "Less is More: Coded Computational photography", ACCV 2007, Part 1, LNCS 4843, pp. 1-12, 2007.
Veeraraghavan et al., "Dappled Photography: Mask Enhanced Cameras for Heterodyned Light Fields and Coded Aperture Refocusing", ACM Siggraph (2007), 12 pages.
Yu et al., "Multi-Perspective Modelling, Rendering and Imaging", Computer Graphics Forum, vol. 29, 2010, No. 1, 20 pages.
International Search Report and Written Opinion of the International Searching Authority for International Application No. PCT/US2014/059110, dated Jan. 5, 2015, 8 pages.
International Preliminary Report on Patentability for International Application No. PCT/US2014/059110, dated Apr. 5, 2016, 6 pages.
Chinese Office Action for Chinese Application No. 201480064829.8, dated Dec. 4, 2018, with translation, 17 pages.

* cited by examiner

DEPTH MAP

DEPTH MAP

DEPTH MAP

DEPTH MAP

XSLIT CAMERA

CROSS REFERENCE TO RELATED APPLICATIONS

This application is a national stage application of Patent Cooperation Treaty Application No. PCT/US2014/059110, entitled "XSLIT CAMERA," filed Oct. 3, 2014, which claims priority to U.S. Provisional Application Ser. No. 61/886,161, entitled "XSLIT CAMERA," filed Oct. 3, 2013, incorporated fully herein by reference.

STATEMENT REGARDING FEDERALLY SPONSORED RESEARCH

The present invention was supported in part by Grant Numbers IIS-CAREER-0845268 and IIS-RI-1016395 from the National Science Foundation. The United States Government may have rights to the invention.

FIELD OF THE INVENTION

The present invention relates to the field of multi-perspective cameras and, more particularly, to methods and XSlit cameras for computer vision applications including Manhattan World (MW) reconstruction, stereo matching and coded aperture imaging.

BACKGROUND OF THE INVENTION

Pinhole cameras are known. A pinhole camera typically includes a single small aperture (i.e., a pinhole) and does not include a lens. A pinhole camera typically collects light rays from a scene that pass through a common Center-of-Projection (CoP). A pinhole camera model describes the mathematical relationship between the coordinates of a three-dimensional (3D) point and its projection onto the image plane of an ideal pinhole camera. Pinhole camera models are commonly used as an imaging model for various computer vision tasks (e.g., object recognition, motion analysis, scene reconstruction, image restoration, etc.). The pinhole model is popular for at least two reasons. First, pinhole geometry is simple; it is uniquely defined by three parameters (the position of the CoP in three-dimensions) and its imaging process can be uniformly described by a conventional 3×4 pinhole camera matrix. Second, human eyes act as a virtual pinhole camera. For example, human eyes may observe lines as lines and parallel lines as converging at a vanishing point. Pinhole cameras, thus, are also commonly referred to as perspective cameras.

Multi-perspective cameras have also been used for computer vision. In general, a multi-perspective camera captures light rays originating from different points in space. Multi-perspective imaging models widely exist in nature. For example, a compound insect eye may include thousands of individual photoreceptor units pointing in slightly different directions. The collected rays by multi-perspective cameras generally do not pass through a common CoP and, thus, do not follow pinhole geometry. Multi-perspective imaging models may provide advantages for perceiving and/or interpreting scene geometry as compared with pinhole imaging models.

Crossed-slit cameras may be traced back to the crossed-slit anamorphoser, credited to Ducos du Hauron. The anamorphoser modifies a pinhole camera by replacing the pinhole with a pair of narrow, perpendicularly crossed slits, spaced apart along the camera axis. Image distortions appear anamorphic or anamorphotic and the degree of anamorphic compression closely matches the estimated distortion using the crossed-slit model. This brute-force implementation of crossed-slits suffers from low light efficiency and poor imaging quality.

SUMMARY OF THE INVENTION

On aspect of the invention may be embodied in a method for reconstructing a scene. The method includes directing light representing the scene through a lens module coupled to an imaging sensor. The lens module includes first and second cylindrical lenses positioned along an optical axis of the imaging sensor, and first and second slit-shaped apertures disposed on the respective first and second cylindrical lenses. A cylindrical axis of the second cylindrical lens is arranged at an angle away from parallel with respect to a cylindrical axis of the first cylindrical lens. The method also includes capturing the light directed through the lens module by the imaging sensor to form at least one multi-perspective image and processing, by a processor, the at least one multi-perspective image to determine a reconstruction characteristic of the scene.

Another aspect of the invention may be embodied in a system. The system includes a camera configured to capture at least one multi-perspective image of a scene and an image processing module. The camera includes a lens module coupled to an imaging sensor. The lens module includes first and second cylindrical lenses positioned along an optical axis of the imaging sensor, and first and second slit-shaped apertures disposed on the respective first and second cylindrical lenses. A cylindrical axis of the second cylindrical lens is arranged at an angle away from parallel with respect to a cylindrical axis of the first cylindrical lens. The image processing module is configured to receive the captured at least one multi-perspective image of the scene and to determine a reconstruction characteristic of the scene.

Still another aspect of the invention may be embodied in a multi-perspective camera. The camera includes an imaging sensor and a lens module coupled to the imaging sensor. The lens module includes a first cylindrical lens and a second cylindrical lens each positioned along an optical axis of the imaging sensor. A cylindrical axis of the second cylindrical lens is arranged at an angle away from parallel with respect to a cylindrical axis of the first cylindrical lens. The lens module also includes a first slit-shaped aperture and a second slit-shaped aperture disposed on the respective first cylindrical lens and the second cylindrical lens. The imaging sensor is configured to capture a multi-perspective image of a scene.

BRIEF DESCRIPTION OF THE DRAWINGS

The invention may be understood from the following detailed description when read in connection with the accompanying drawing. It is emphasized that, according to common practice, various features of the drawing may not be drawn to scale. On the contrary, the dimensions of the various features may be arbitrarily expanded or reduced for clarity. Moreover, in the drawing, common numerical references are used to represent like features. Included in the drawing are the following figures.

Figure 1:
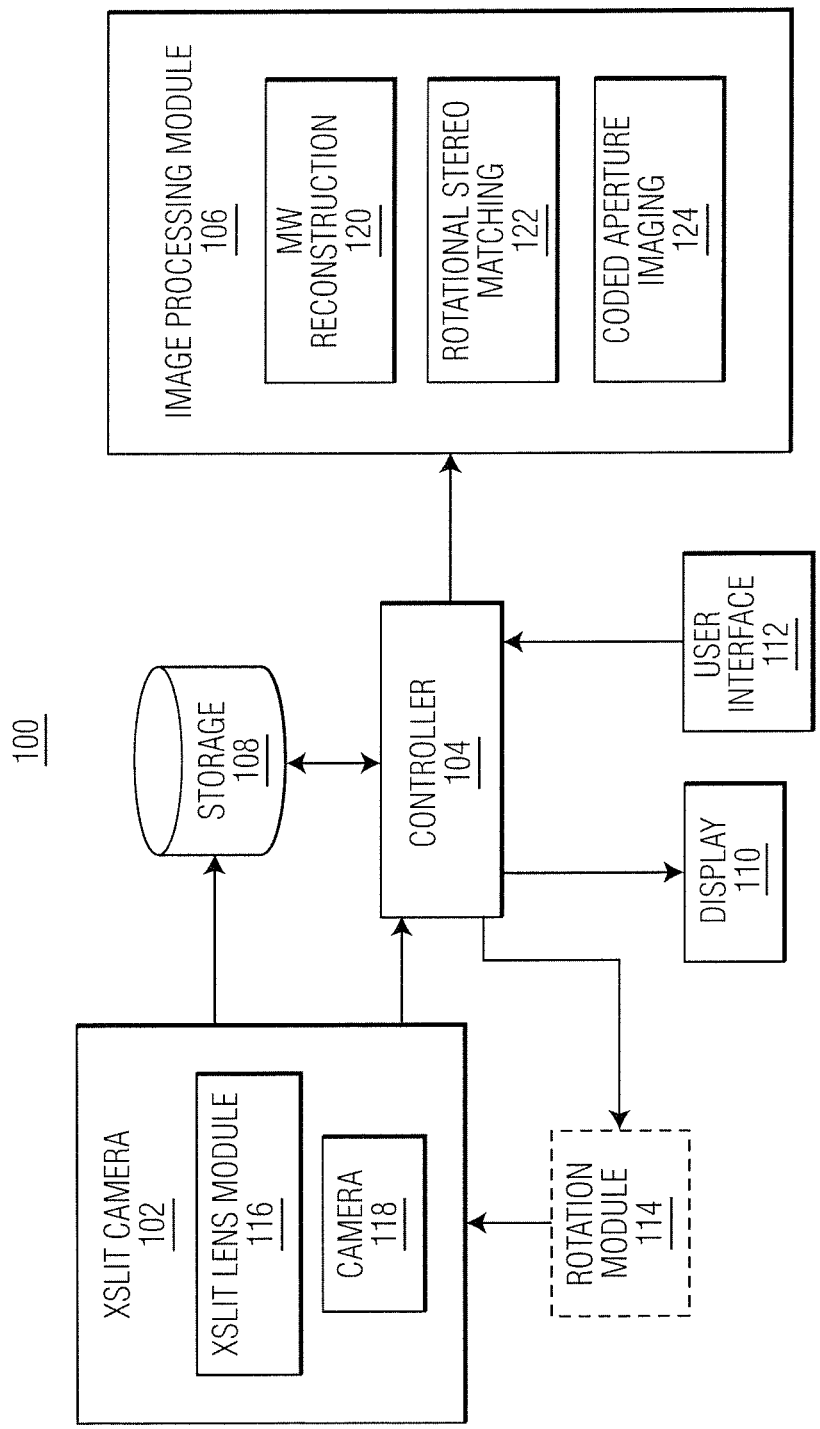
FIG. 1 is a functional block diagram of an example XSlit imaging system, according to an aspect of the present invention.
Figure 2A:
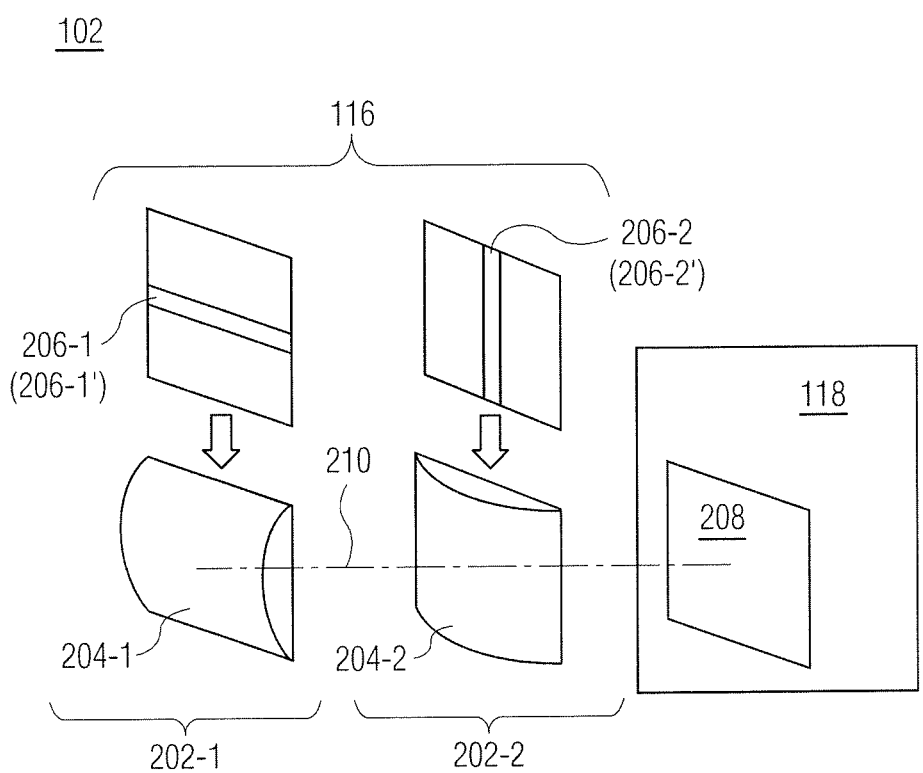
FIG. 2A is an exploded perspective view diagram of an example XSlit camera of the imaging system shown in FIG.
Figure 2B:
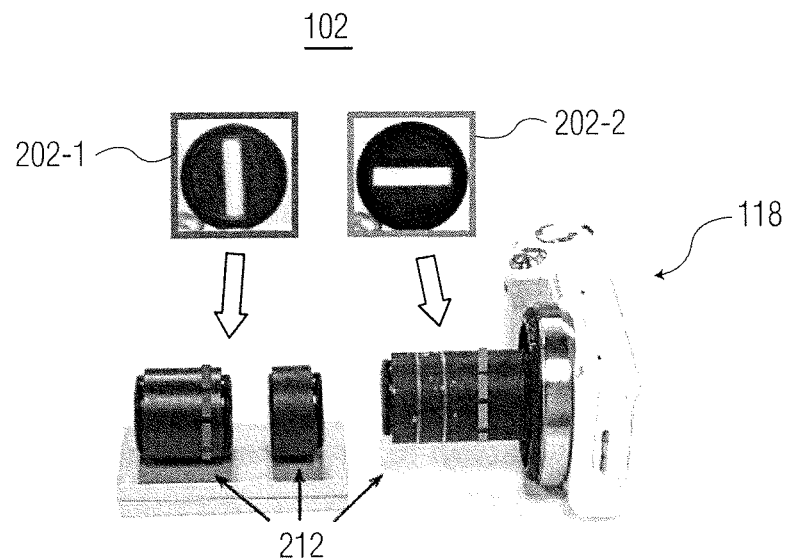
Figure 2C:
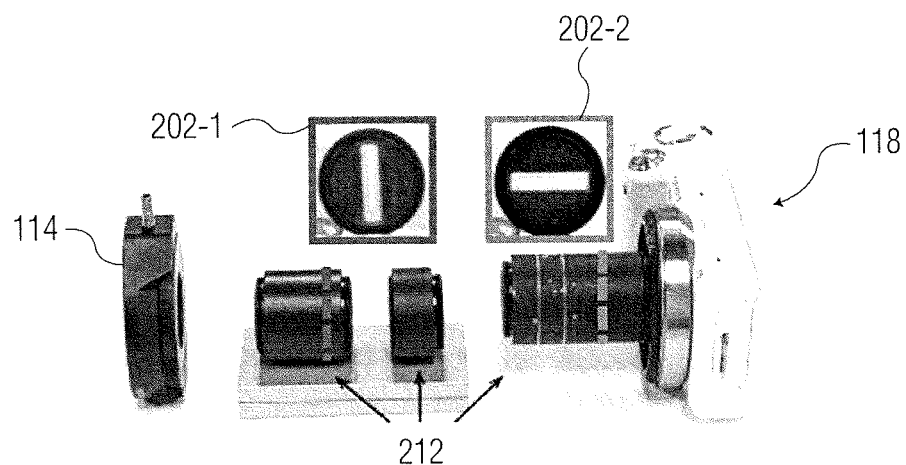
Figure 3A:
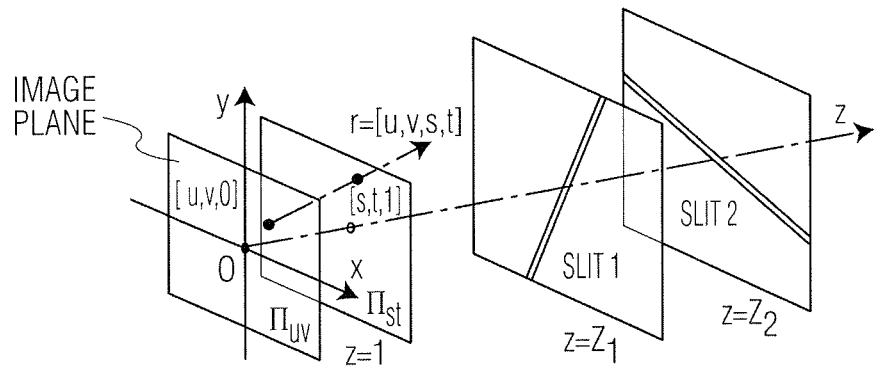
Figure 3B:
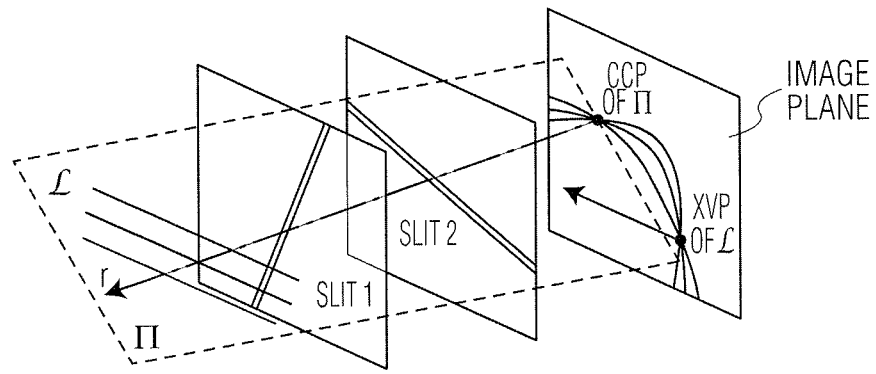
Figure 3C:
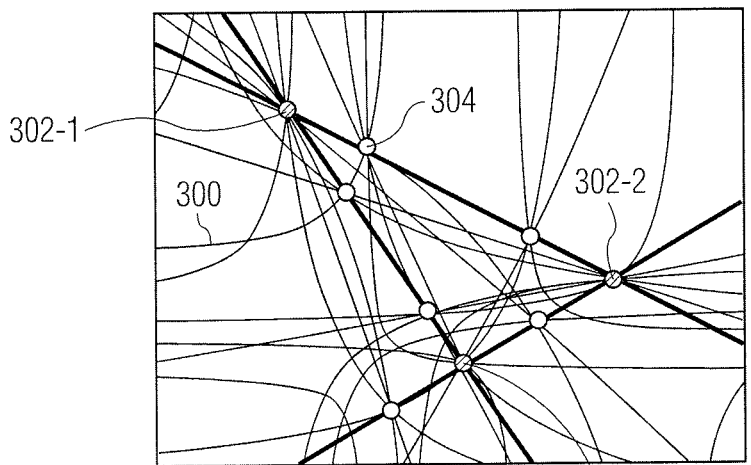
Figure 4:
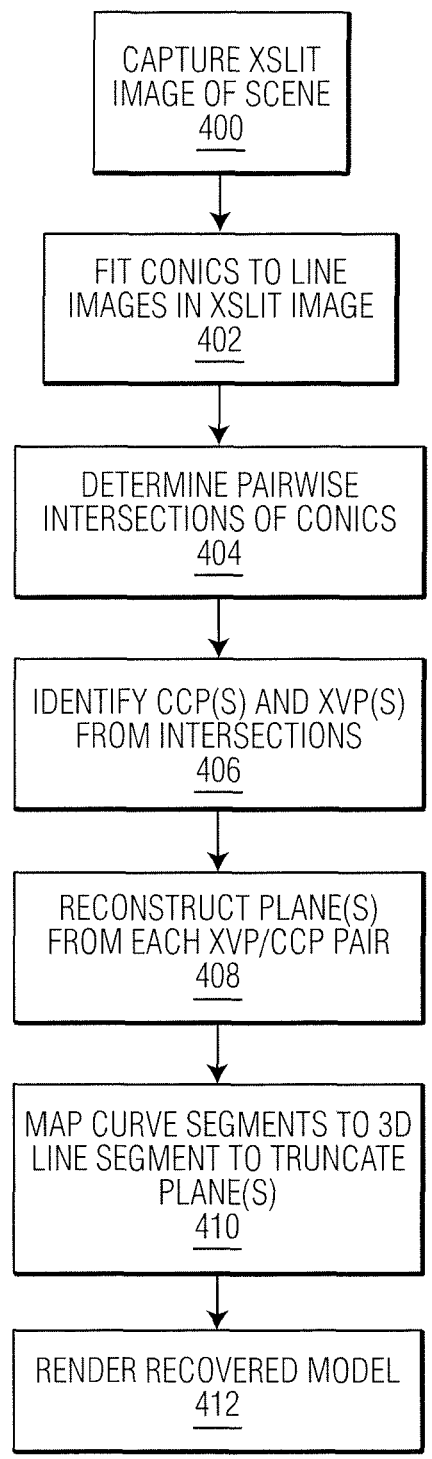
Figure 5A:
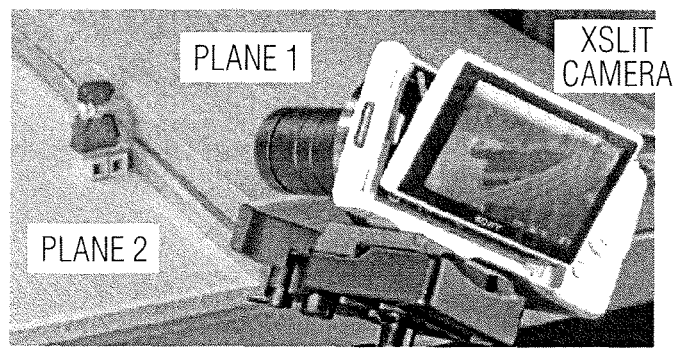
Figure 5B:
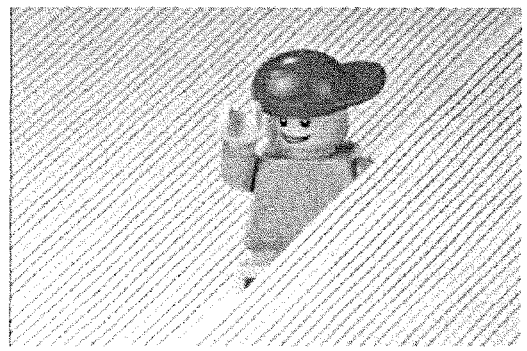
Figure 5C:
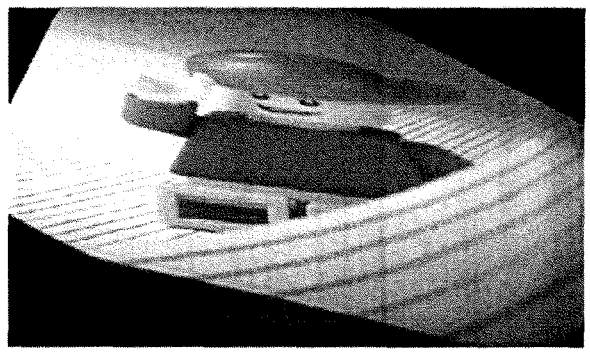
Figure 5D:
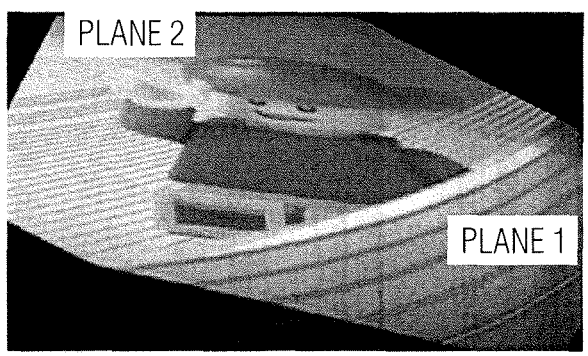
Figure 6A:
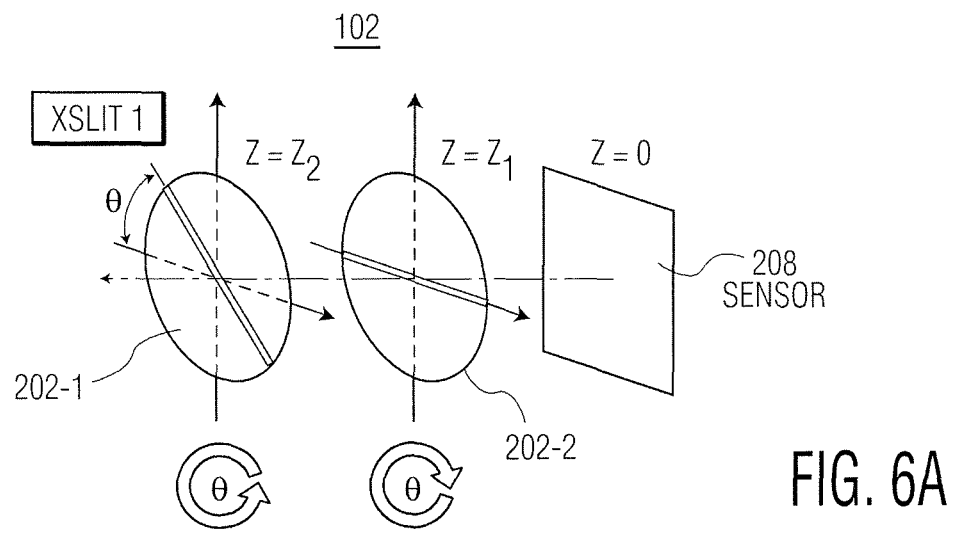
Figure 6B:
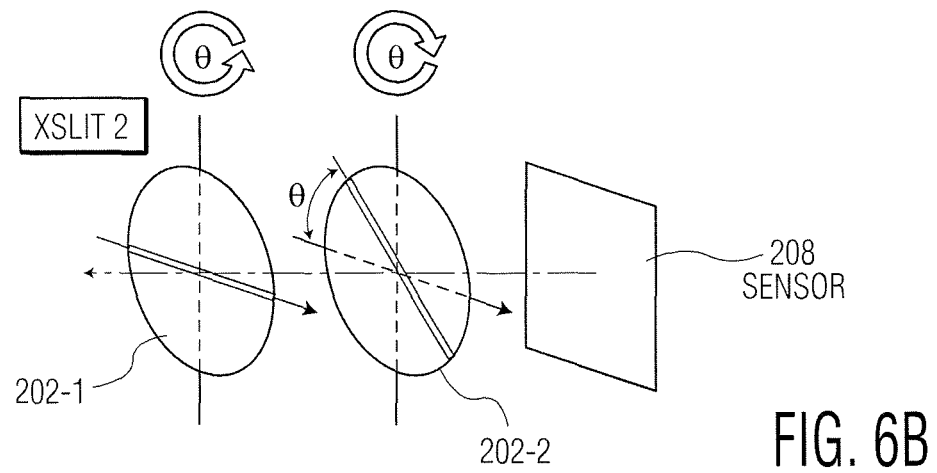
Figure 6C:
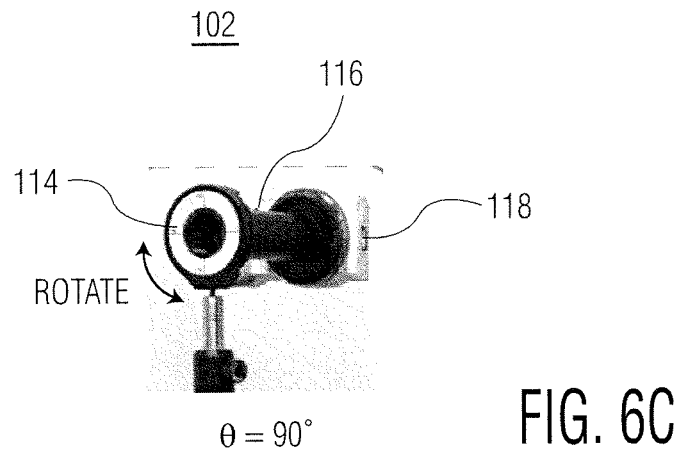
Figure 6D:
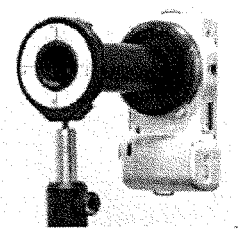
Figure 7A:
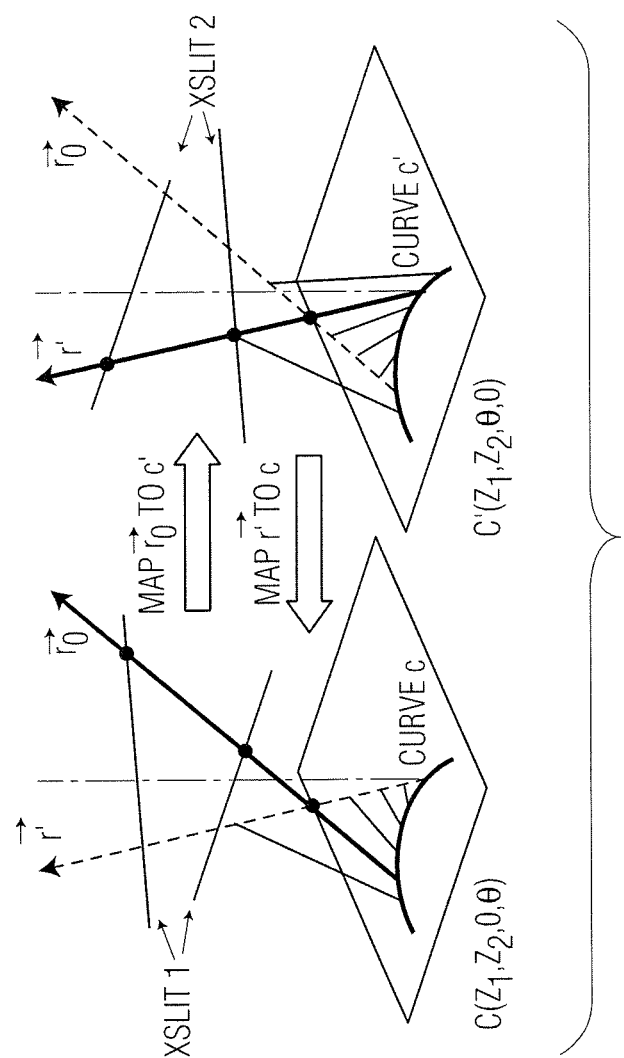
Figure 7B:
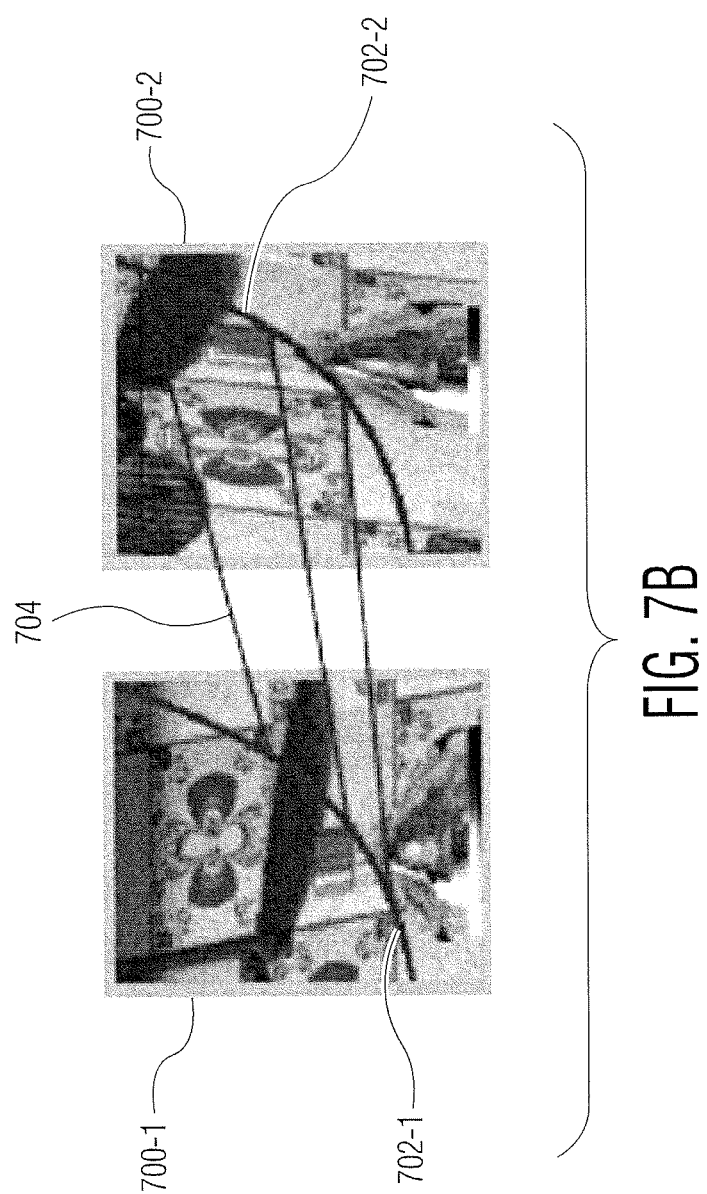
Figure 8:
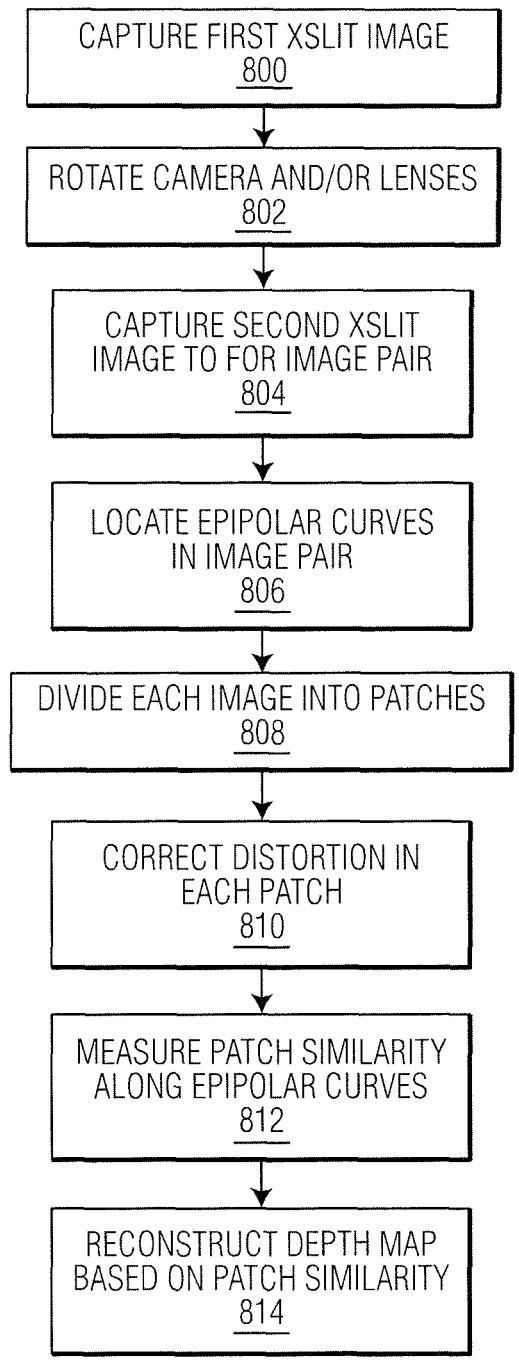
Figure 9A:
Figure 9B:
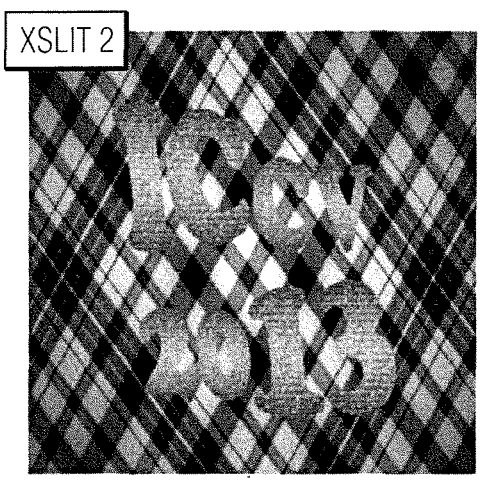
Figure 9C:
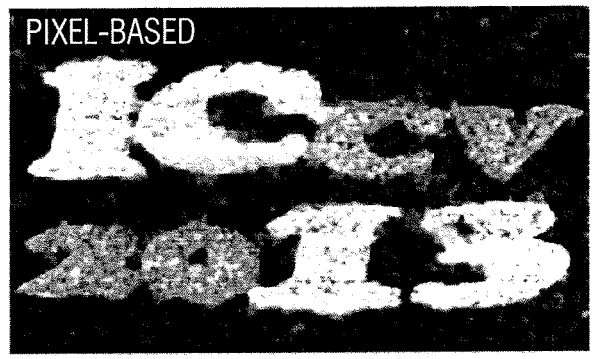
Figure 9D:
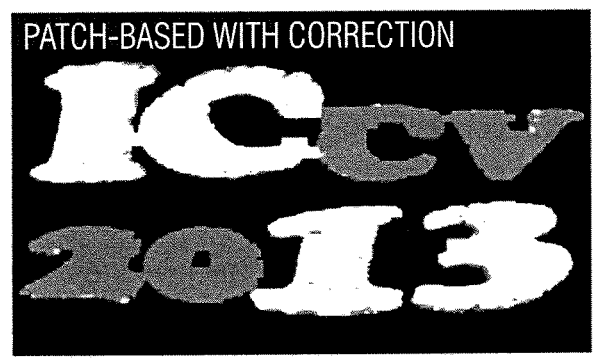
Figure 9E:
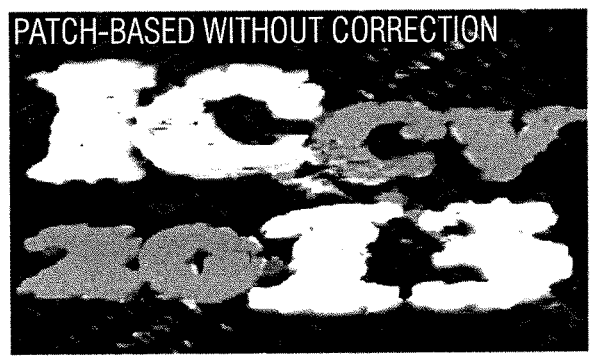
Figure 10A:
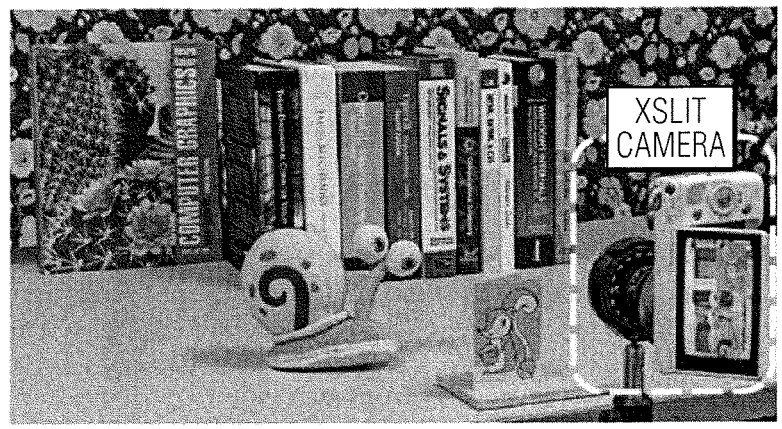
Figure 10B:
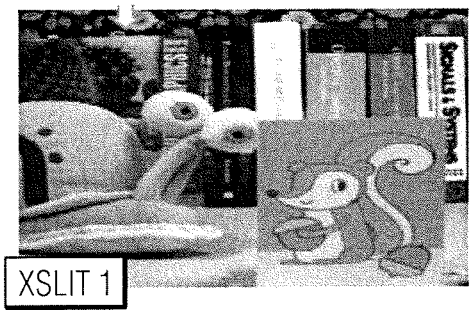
Figure 10C:
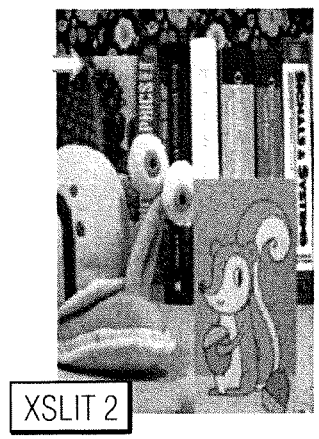
Figure 11:
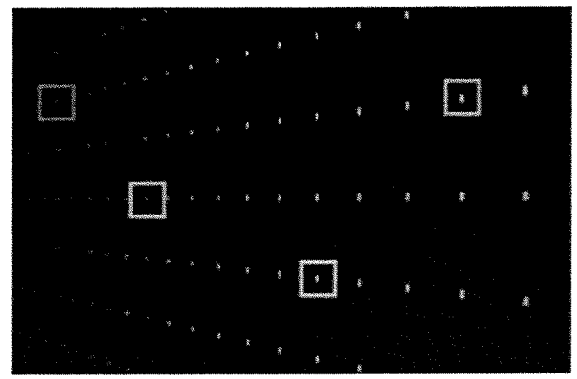
Figure 11A:
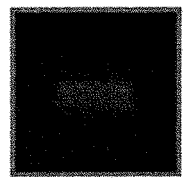
Figure 11B:
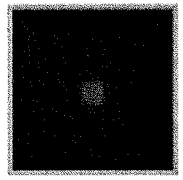
Figure 11C:
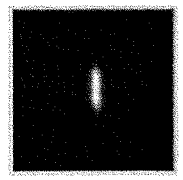
Figure 11D:
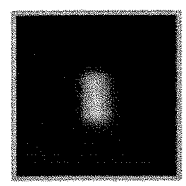
Figure 12:
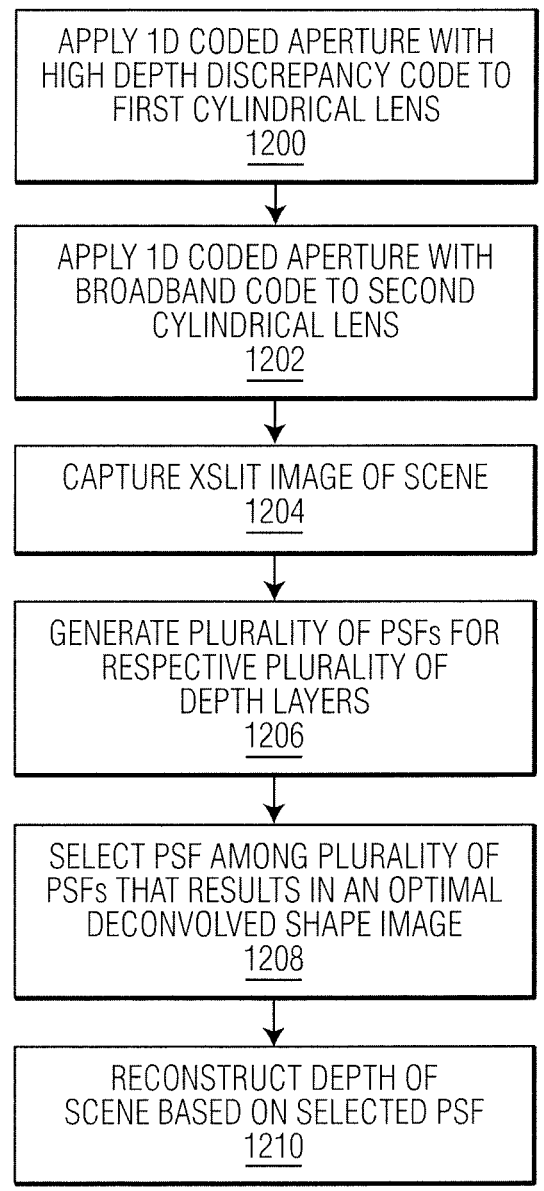
Figure 13A:
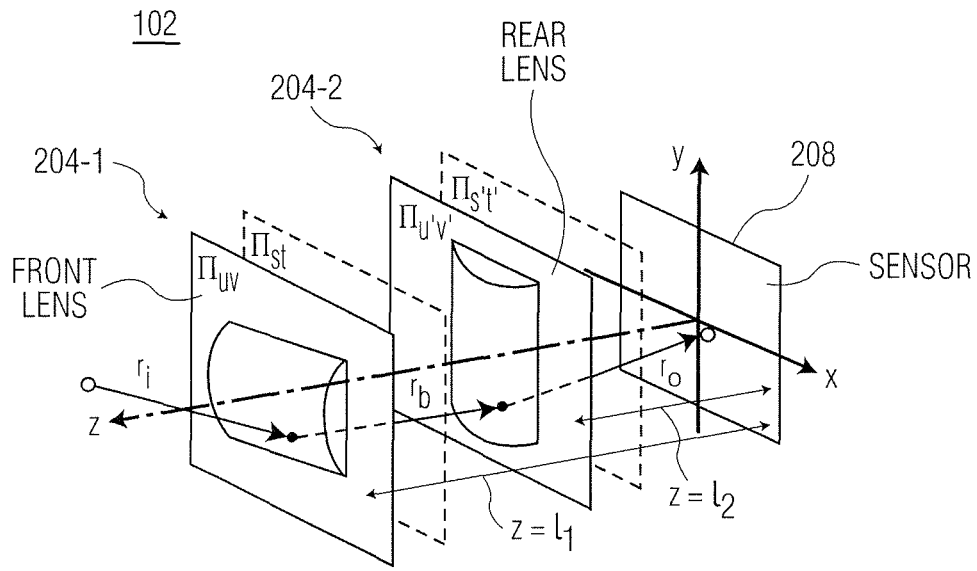
Figure 13B:
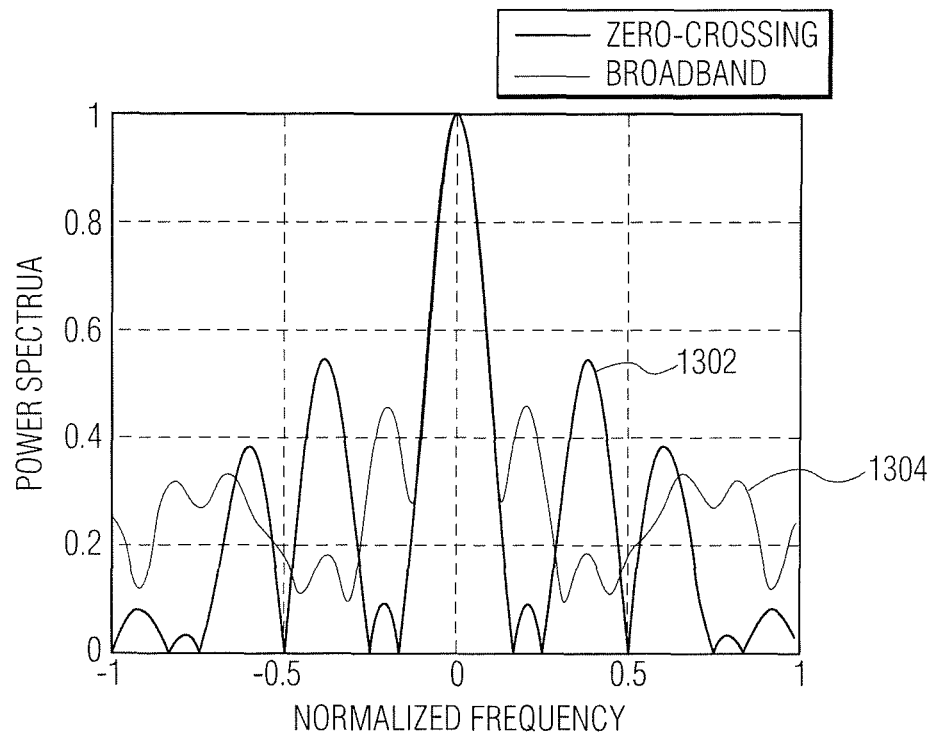
Figure 14A:
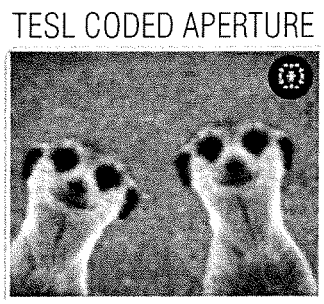
Figure 14B:
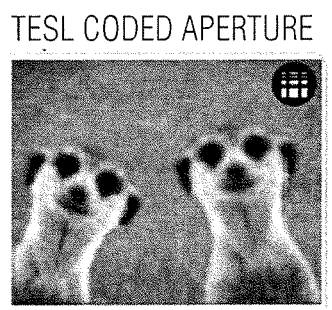
Figure 14C:
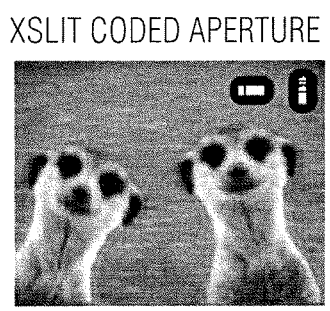
Figure 14D:
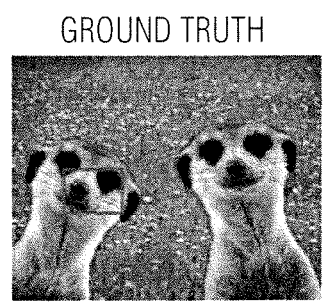
Figure 14E:
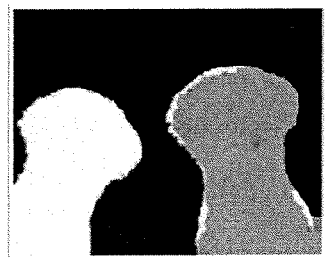
Figure 14F:
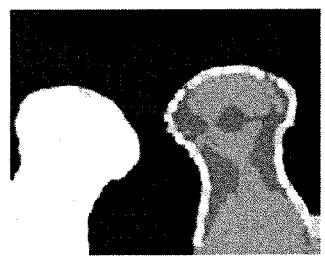
Figure 14G:
Figure 14H:
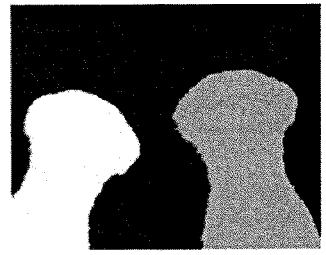
Figure 14I:
Figure 14J:
Figure 14K:
Figure 14L:
Figure 14M:
Figure 14N:

1, illustrating components of an XSlit lens module and camera, according to an aspect of the present invention;

FIG. 2B is a perspective view diagram of an example XSlit camera shown in FIG. 2A, according to an aspect of the present invention;

FIG. 2C is a perspective view diagram of an example XSlit camera and rotation module of the imaging system shown in FIG. 1, according to another aspect of the present invention;

FIG. 3A is a perspective view diagram of slit apertures of the XSlit camera shown in FIG. 2A with respect to two image planes, illustrating light ray geometry for the an XSlit camera, according to an aspect of the present invention;

FIG. 3B is a perspective view diagram of slit apertures of the XSlit camera shown in FIG. 2A, an image plane and a plane having coplanar parallel lines, illustrating that the image of the coplanar lines is curved and intersects at two different points on the image plane, according to an aspect of the present invention;

FIG. 3C is an example set of line images, illustrating identification of XSlit vanishing points (XVPs) and coplanar common points (CCPs) from the intersection of the line images, according to an aspect of the present invention;

FIG. 4 is a flow chart diagram illustrating an exemplary method for reconstruction of a MW scene, according to an aspect of the present invention;

FIG. 5A is an image illustrating an example MW scene, according to an aspect of the present invention;

FIG. 5B is an image of the MW scene shown in FIG. 5A, as captured by a perspective camera;

FIGS. 5C and 5D are example images illustrating the MW scene shown in FIG. 5A, as captured by an XSlit camera shown in FIG. 2A and as reconstructed according to MW reconstruction processing, respectively, according to an aspect of the present invention;

FIGS. 6A and 6B are exploded perspective view diagrams of an example XSlit camera illustrating a slit aperture arrangement for capturing a rotational stereo image pair, according to an aspect of the present invention;

FIGS. 6C and 6D are perspective view diagrams of an example XSlit camera and rotation ring for capturing a rotational stereo image pair, according to an aspect of the present invention;

FIG. 7A is a perspective view diagram of epipolar curves and geometry in a rotational XSlit stereo image pair, according to an aspect of the present invention;

FIG. 7B are images illustrating an example rotational XSlit stereo image pair and corresponding epipolar curves, illustrating corresponding feature points on both epipolar curves, according to an aspect of the present invention;

FIG. 8 is a flow chart diagram illustrating an exemplary method for rotational stereo matching, according to an aspect of the present invention;

FIGS. 9A and 9B illustrate an example pair of rotational XSLit stereo images of a scene, according to an aspect of the present invention;

FIGS. 9C, 9D and 9E are example images illustrating respective disparity maps recovered from the stereo image pair of FIGS. 9A and 9B, for a pixel-based scheme, a patch-based scheme with distortion correction and a patch-based scheme without distortion correction, according to an aspect of the present invention;

FIGS. 10A, 10B and 10C are images illustrating an example scene and a pair of rotational XSlit stereo images of the scene, according to an aspect of the present invention;

FIGS. 10D, 10E, 10F and 10G are example stereo matching results and disparity maps of the scene shown in FIG. 10A for different XSlit baselines, according to an aspect of the present invention;

FIG. 11 is an example image of a point spread function (PSF) captured by an XSlit camera, according to an aspect of the present invention;

FIGS. 11A, 11B, 11C and 11D illustrate the boxed-portions of the image shown in FIG. 11A, from left-to-right;

FIG. 12 is a flow chart diagram illustrating an exemplary method for coded aperture imaging, according to an aspect of the present invention;

FIG. 13A is a perspective view diagram of an example XSlit camera used for coded aperture imaging, illustrating XSlit lens positioning and light ray transformation through the XSlit camera, according to an aspect of the present invention;

FIG. 13B is a graph of example power spectra as a function of frequency for depth discrepancy and broadband coded apertures, according to an aspect of the present invention;

FIGS. 14A, 14B, 14C and 14D are example images of a synthetic scene, including a ground truth image, an XSlit coded aperture image and throughput equivalent spherical lens (TESL) coded aperture images, according to an aspect of the present invention;

FIGS. 14E, 14F, 14G and 14H are example depth map images for the coded aperture and ground truth images shown in respective FIGS. 14A-14D;

FIGS. 14I, 14J and 14K are example resulting de-blurred images based on the respective TESL and XSlit coded aperture images shown in FIGS. 14A-14C; and FIGS. 14L, 14M, 14N and 14O are images illustrating portions of the images shown in respective FIGS. 14D, 14I, 14J and 14K.

DETAILED DESCRIPTION OF THE INVENTION

Aspects of the present invention relate to a camera configured to capture at least one multi-perspective image of a scene and an image processing module for processing the captured at least one multi-perspective image of the scene. The camera includes a lens module coupled to an imaging sensor. The lens module includes first and second cylindrical lenses positioned along an optical axis of the imaging sensor, and first and second slit-shaped apertures disposed on the respective first and second cylindrical lenses. A cylindrical axis of the second cylindrical lens is arranged at an angle away from parallel with respect to a cylindrical axis of the first cylindrical lens. The image processing module is configured to receive the captured at least one multi-perspective image of the scene and to determine a reconstruction characteristic of the scene.

The angle of the first and second cylindrical lenses may be greater than or equal to 90 degrees and less than 180 degrees. Thus, the lens module is also described herein as an XSlit lens module, the camera is described as an XSlit camera and the multi-perspective image is referred to as an XSlit image. In some examples, the XSlit camera may be configured to capture two images at different cylindrical lens positions (relative to the imaging sensor). The two images are also referred to as a rotational stereo image pair. In some examples, the XSlit camera may include coded apertures, including a depth discrepancy code and an broadband code, in order to perform coded aperture imaging.

The reconstruction characteristic of the scene may include identification of one or more planes in an image (such as for Manhattan World (MW) reconstruction), depth map determination (such as via rotational stereo imaging) and/or depth reconstruction of a scene (such as via coded aperture imaging). In some examples, the image processing module may be configured to perform MW reconstruction from a captured XSlit image. In some examples, the image processing module may be configured to perform rotational stereo matching, from a rotational XSlit stereo image pair. In some examples, the image processing module may be configured to coded aperture imaging from a captured XSlit coded image.

Referring to FIG. 1, an XSlit imaging system 100 for capturing and processing multi-perspective images (also referred to herein as XSlit images) is shown. System 100 includes XSlit camera 102, controller 104, image processing module 106, storage 108, display 110 and user interface 112. In some examples, system 100 may include rotation module 114, such as for performing rotational stereo matching with rotational stereo matching module 122 (described further below with respect to FIG. 8). Although not shown, system 100 may be coupled to a remote location, for example via a global network (i.e., the Internet).

XSlit camera 102 includes XSlit lens module 116 and camera 118. As described further below with respect to FIGS. 2A and 2B, lens module 116 includes first and second slit lenses 202-1, 202-2 disposed along an optical axis 210 of XSlit camera 102, with first slit lens 202-1 arranged at an angle relative to second slit lens 202-2. In some examples, slit lenses 202 are positioned orthogonal to each other (as shown in FIG. 2A). In other examples, slit lenses 202 are arranged at an oblique angle (i.e., neither parallel nor coplanar), as shown in FIG. 3A. Camera 118 may include any suitable general purpose camera having a main lens and an imaging sensor (such as imaging sensor 208 shown in FIG. 2A). In one example, camera 118 includes a digital camera manufactured by Sony Corporation, model number NEX-5N. To convert camera 118 to XSlit camera 102, XSlit lens module 116 may be attached to a main lens of camera 118 (shown in FIG. 2B). XSlit camera 102 may be configured to capture XSlit images (i.e., multi-perspective images) of a scene.

Controller 104 may be coupled to one or more of XSlit camera 102, image processing module 106, storage 108, display 110, user interface 112 and optional rotational module 114, to control capture, storage, display and/or processing of XSlit images. Controller 104 may include, for example, a logic circuit, a digital signal processor or a microprocessor. It is understood that one or more functions of image processing module 106 may be performed by controller 104.

Image processing module 106 may include one or more of Manhattan World (MW) reconstruction processing module 120, rotational stereo matching module 122 and coded aperture imaging module (described in further detail below with respect to FIGS. 4, 8, 12). MW reconstruction module 120 may be configured to reconstruct planes of a MW scene captured by XSlit camera 102. Rotational stereo matching module 122, in combination with rotation module 114, may capture a pair of XSlit images (via rotation of XSlit camera 102) and perform stereo matching, to reconstruct a depth map of a captured scene. Coded aperture imaging module 124 may use coded apertures with XSlit camera 102, to reconstruct a depth of a scene captured by XSlit camera 102. Image processing module 106 may include, for example, a logic circuit, a digital signal processor or a microprocessor.

Storage 108 may be configured to store at least one of captured XSlit images from XSlit camera 102, processed images and/or image processing results (from image processing module 106). Storage 108 may include any suitable tangible, non-transitory computer readable medium, for example, a magnetic disk, an optical disk or a hard drive.

Captured XSlit images (from XSlit camera 102) and/or processed images/results (from image processing module 106) may be displayed on display 110. Display 110 may include any suitable display device configured to display images/image processing results. User interface 112 may include any suitable user interface capable of receiving user input associated with, for example, selection of modules 120-124 of image processing module 106 (e.g., when more than one module is included in image processing module 106), parameters associated with image processing module 104, storage selection in storage 108 for captured images/processed images/processed results, display selection for images/results and/or parameters associated with optional rotation module 114. User interface 112 may include, for example, a pointing device, a keyboard and/or a display device. Although user interface 112 and display 110 are illustrated as separate devices, it is understood that the functions of user interface 112 and display 110 may be combined into one device.

Optional rotation module 114 may be configured to rotate slit lenses 202 and/or camera 118. Rotation module 114 may be used in combination with rotational stereo matching module 122, to capture a pair of XSlit images from XSlit camera 102. As shown in FIGS. 6A-6D, rotation module rotates slit lenses 202-1, 202-2 relative to camera 118 by 90 degrees, in order to capture the same scene twice with a different slit lenses 202 arrangement (relative to optical axis 210). In some examples, first and second slit lenses 202-1, 202-2 may be physically rotated, as shown in FIGS. 6A and 6B. In other examples, camera 118 may be physically rotated, as shown in FIGS. 6C and 6D, to produce the same effect as rotating each slit lenses 202-1, 202-2.

Suitable XSlit camera 102, controller 104, image processing module 106, display 110, user interface 112 and optional rotation module 114 may be understood by the skilled person from the description herein.

Referring next FIGS. 2A and 2B, example XSlit camera 102 is shown. In particular, FIG. 2A is an exploded perspective view diagram of XSlit camera 102 and FIG. 2B is a perspective view diagram of XSlit camera 102. FIG. 2A illustrates the arrangement of XSlit lens module 116 and imaging sensor 208 of camera 118 relative to optical axis 210. FIG. 2B illustrates an example arrangement of slit lenses 202-1, 202-2 within lens tubes 212 of camera 118. It is understood that the arrangement shown in FIG. 2B represents an example embodiment of XSlit camera 102, and that other cameras 118 and lens tube 112 arrangements may be used. Although three lens tubes 212 are shown in FIG. 2B, camera 118 may include fewer lens tubes 212 or additional lens tubes 212. In some examples, slit lenses 202-1, 202-2 may be coupled directly to camera 118, without any lens tubes 212. Lens tube 212 may be used to align slit lenses 202-1, 202-2 according to a predetermined angle (i.e., orthogonally or at an oblique angle).

As shown in FIG. 2A, XSlit module 116 includes first slit lens 202-1 and second slit lens 202-2 disposed along optical axis 210. Each slit lens 202 includes cylindrical lens 204 (having a cylindrical axis extending through the lens) and slit aperture 206. Slit aperture 206 is disposed on cylindrical lens 204 and arranged such that the slit length extends along the cylindrical axis direction of cylindrical lens 204. First slit lens 202-1 is positioned at an angle relative to second slit lens 202-1, the angle relative to the cylindrical lens axes of first cylindrical lens 204-1 and second cylindrical lens 204-2. The angle between first and second slit lenses 202-1, 202-2 may be less than 180 degrees and greater than or equal to 90 degrees. Because first slit lens 202-1 is arranged at an angle to second slit lens 202-2, the combination of first and second slit lenses 202-1, 202-2 form an cross (i.e., an X) relative to optical axis 210.

XSlit camera 102 may collect light rays that simultaneously pass through two slits 206-1, 206-2 (either oblique or orthogonal) in 3D space. Cylindrical lens 204 is a section of a cylinder that focuses rays passing through it onto a line parallel to the intersection of the surface of lens 204 and a plane tangent to it (such as imaging sensor 208). Cylindrical lens 204 compresses the image in the direction perpendicular to this line, and leaves it unaltered in the direction parallel to it (in the tangent plane). Two layers of cylindrical lenses (204-1, 204-2) may be concatenated to synthesize an XSlit lens module 116. To further increase a depth of field of XSlit camera 102, each cylindrical lens 204 is coupled with slit-shaped aperture 206. Generally, the narrower the slit width, the deeper the depth of field that may be captured by XSlit camera 102.

In some examples, slit apertures 206-1, 206-2 may be replaced with one dimensional (1D) coded apertures 206-1', 206-2'. Coded apertures 206' may be used with coded aperture imaging module 124 to reconstruct the depth of a scene via coded aperture imaging. First coded aperture 206-1' may include a high depth discrepancy code, whereas second coded aperture 206-2' may include a broadband code. Coded aperture imaging module is described further below with respect to FIG. 12.

Referring to FIG. 2C, a perspective view diagram of XSlit camera 102 arranged with rotation module 114 is shown. The example shown in FIG. 2C may be used to perform rotational stereo matching (described further below with respect to FIGS. 6A-6D and FIG. 8). It is understood that the arrangement shown in FIG. 2C represents an example embodiment of XSlit camera 102 and rotation module 114, and that other cameras 118, other lens tube(s) 112 arrangements (or lack thereof) and types of rotation modules 114 may be used to perform rotational stereo matching. In FIG. 2C, rotation module 114 is represented as an indexed rotation ring. The indexed rotation ring may be used to maintain first and second slit lenses 202-1, 202-2 in a same arrangement while rotating camera 118 by 90 degrees (as shown in FIGS. 6C and 6D), in order to capture a pair of (rotational) stereo images of a scene.

Referring back to FIG. 1, XSlit camera 102 may be used in a number of computer vision applications. Several examples of computer vision applications are represented by image processing module 106, including MW reconstruction module 120, rotational stereo matching module 122 and coded aperture imaging module 124. These three computer vision applications are described next. It is understood that the computer vision applications illustrated in FIG. 1 represents example computer vision applications of XSlit camera 102, and that XSlit camera 102 may also be used for other computer vision applications.

Manhattan World (MW) Reconstruction

A Manhattan World scene typically describes a real world scene based on Cartesian coordinates. A MW scene is composed of planar surfaces and parallel lines aligned with three mutually orthogonal principal axes. The MW model fits well to many man-made (interior/exterior) environments that exhibit strong geometry regularity such as flat walls, axis-aligned windows and sharp corners (e.g., such as an urban scene). Previous efforts have focused on reconstructing MW scenes from images and using the MW assumption for camera calibration. A challenge for MW reconstruction is that a MW scene generally exhibits repeated line patterns but lacks textures for distinguishing between them, making it difficult to directly apply stereo matching.

MW reconstruction from a single image is challenging. Current approaches exploit monocular cues such as vanishing points and reference planes (e.g., ground) for approximating scene geometry. Some approaches use image attributes (color, edge orientation, etc.) to label image regions with different geometric classes (e.g., sky, ground, vertical) and use this information to generate visually pleasing 3D reconstructions. Some approaches detect line structures in the image to recover vanishing points and camera parameters. Other approaches apply machine learning techniques to infer depths from image features and use Markov Random Field (MRF) to determine the location and orientation of planar regions.

MW reconstruction module 120 of imaging system performs single-image Manhattan World (MW) reconstruction using an XSlit image (from XSlit camera 102). A difficulty of pinhole-based MW reconstruction is coplanar ambiguities. Although the vanishing point of a group of parallel 3D lines may be detected by a pinhole imaging, there is some ambiguity over which lines belong to the same plane. The coplanar ambiguity may be resolved by using XSlit camera 102 to acquire the scene. Conceptually, 3D parallel lines are mapped to two-dimensional (2D) curves in XSlit camera 102. These 2D curves will intersect at multiple points instead of a single vanishing point (shown in FIG. 3B). Similar to in the pinhole camera, images of parallel lines in an XSlit image, although curved, will still converge at a vanishing point (referred to as an XSlit Vanishing Point (XVP)). In contrast to a pinhole camera, however, XSlit images of coplanar 3D lines will generally intersect at a second common point (referred to herein as Coplanar Common Point (CCP)). The CCP is a feature of XSlit camera 102 that does not exist in pinhole camera. MW reconstruction according to MW reconstruction module 102 directly recovers the geometry of 3D lines from the identified XVPs and CCPs, to reconstruct the MW scene.

Referring to FIG. 3A, a ray geometry of XSlit camera 102 is described. In FIG. 3A, slits 1 and 2 relate to respective slit apertures 206-1, 206-2, and the image plane may relate to imaging sensor 208 in FIG. 2A. Conventional approaches use the projection from 3D points to 2D pixels to model the imaging process in a camera. As described below, the projection process is decomposed into two components: mapping from a 3D point to a ray collected in XSlit camera 102 and mapping from the ray to a pixel. A two-plane parameterization (2PP) for parameterizing rays is used. In 2PP, each ray (r) is parameterized as [u, v, s, t], where [u, v] and [s, t] are the intersections with the two parallel image planes $\pi_{uv}$ and $\pi_{st}$ lying at z=0 and z=1 respectively. Ray [u, v, s, t] can be viewed as a two-point representation of a line. To further simplify the analysis, [u, v, σ, τ] parameterization is used, where σ=s−u and τ=t−v. Image plane $\pi_{uv}$ is selected as the default image (sensor) plane so that [σ, τ, 1] can be viewed as the direction of the ray.

An XSlit camera collects rays that simultaneously pass through two slits (either oblique (i.e., neither parallel nor coplanar) or orthogonal) in 3D space. Given two slits $l_1$ and $l_2$, the 2PP may be constructed as follows: $\pi_{uv}$ and $\pi_{st}$ are selected such that they are parallel to both slits but do not contain them, as shown in FIG. 3A. Next, both slits are orthogonally projected on $\pi_u$, and their intersection point is used as the origin of the coordinate system. It is assumed $l_1$ and $l_2$ lie at $z=Z_1$ and $z=Z_2$ with directions $[d_x^1, d_y^1, 0]$ and $[d_x^2, d_y^2, 0]$, where $Z_1 \neq Z_2$ and $d_x^1 d_y^2 - d_y^1 d_x^2 \neq 0$.

The inventors have determined that the ray geometry constraints (also referred to as XSRC) for rays in XSlit camera 102 are:

$$\begin{cases} \sigma = (Au + Bv)/E \\ \tau = (Cu + Dv)/E \end{cases} \quad (1)$$

where $$A = d_x^2 d_y^1 Z_2 - d_x^1 d_y^2 Z_1, \ B = d_x^1 d_x^2 (Z_1 - Z_2),$$
$$D = d_x^2 d_y^1 Z_1 - d_x^1 d_y^2 Z_2, \ C = d_y^1 d_y^2 (Z_2 - Z_1), \ E = (d_x^1 d_y^2 - d_x^2 d_y^1) Z_1 Z_2$$

The inventors have determined the constraints for light rays to pass through a 3D line (l) (i.e., 3D lines related to a 3D scene), for 3D lines parallel to imaging sensor plane ($\pi_{uv}$) and not parallel to the imaging sensor plane ($\pi_{uv}$). The parallel linear constraint is:

$$\frac{u}{d_x^l} - \frac{v}{d_y^l} + \frac{z_l \sigma}{d_x^l} - \frac{z_l \tau}{d_y^l} - \frac{x_l}{d_x^l} + \frac{y_l}{d_y^l} = 0 \quad (2)$$

The non-parallel line constraint for 3D line is:

$$\frac{u - u_l}{v - v_l} = \frac{\sigma - \sigma_l}{\tau - \tau_l} \quad (3)$$

The XSRC (equation 1) and 3D line constraints (equations 2 and 3) may be used to examine the XSlit image of a 3D line (l). In particular, the inventors have determined that 3D lines map to 2D conics (shown in FIG. 3B), and that the conics are hyperbolas of the form:

$$\tilde{A}u^2 + \tilde{B}uv + \tilde{C}v^2 + \tilde{D}u + \tilde{E}v + \tilde{F} = 0 \quad (4)$$

with $$\tilde{A} = C, \ \tilde{B} = (D-A), \ \tilde{C} = -B, \ \tilde{D} = (Av_l - Cu_l - E\tau_l),$$

$$\tilde{E} = (Bv_l - Du_l + E\sigma_l), \ \tilde{F} = E(u_l \tau_l - v_l \sigma_l),$$

where $\tilde{A}$, $\tilde{B}$, $\tilde{C}$, $\tilde{D}$, $\tilde{E}$ and $\tilde{F}$ represent coefficients of the hyperbola, coefficients A-F are shown in equation (1) and $\tilde{A}$, $\tilde{B}$ and $\tilde{C}$ are XSlit intrinsic properties (i.e., they are identical for all 3D lines). A 3D line cannot be reconstructed directly from its hyperbola image. This is because a 3D line has four unknowns ($u,v,\sigma,\tau$) while the above analysis may be used to determine u and v coefficients, and the constant term in Eqn. (3). A similar ambiguity exists in pinhole cameras.

Referring to FIG. 3B, for XSlit camera 102, the images of coplanar lines $\mathcal{L}$ (on plane $\pi$) will intersect on the image plane $\pi_{uv}$ at two common points, the XSlit vanishing point (XVP) and the coplanar vanishing point (CCP). Thus, provided that the parallel lines $\mathcal{L}$ are not parallel to image plane $\pi_{uv}$, their images on the image plane have a vanishing point XVP. For a set of lines $\mathcal{L}$ that lie on plane $\pi$ that are not parallel to both slits (slits 1 and 2), their images in XSlit camera 102 intersect at a second common point CCP. CCP is a unique image feature in XSlit camera 102 that does not exist in pinhole cameras. The inventors have determined that, given a set of coplanar parallel lines $\mathcal{L}$, if these lines have a CCP, the CCP does not coincide with the XVP of lines $\mathcal{L}$.

To recover plane $\pi$, the normal of $\pi$ is determined. Given the XVP $[u_v, v_v]$ and the XSlit intrinsic parameters (A, B, C, D, and E), the direction of $\mathcal{L}$ ($\vec{T}_v = [\sigma_v, \tau_v, 1]$) is determined as:

$$\begin{cases} \sigma_v = (Au_v + Bv_v)/E \\ \tau_v = (Cu_v + Dv_v)/E \end{cases} \quad (5)$$

The CCP $[u_c, v_c]$ also corresponds to a ray lying on plane $\pi$. The direction of the CCP ($\vec{T}_c = [\sigma_c, \tau_c, 1]$) can be determined from equation (1) as:

$$\begin{cases} \sigma_c = (Au_c + Bv_c)/E \\ \tau_c = (Cu_c + Dv_c)/E \end{cases} \quad (6)$$

Because the XVP and the CCP will not coincide, the directions of $\mathcal{L}$ and CCP (i.e., $\vec{T}_v, \vec{T}_c$) are not collinear. The normal of $\pi$ is thus $\vec{n} = \vec{T}_v \times \vec{T}_c$. Finally, because the CCP lies on $\pi$, the offset d of $\pi$ is determined as:

$$d = n_x u_c + n_y v_c, \quad (7)$$

where the normal is $\vec{n} = [n_x, n_y, n_z]$).

Referring to FIG. 3C, for a MW scene, it is assumed that objects in the scene are composed of planes and lines aligned with three mutually orthogonal principal axes. In a MW scene as captured by XSlit camera 102, all CCPs 302 and XVPs 304 lie on a triangle where XVPs 304 correspond to the triangle vertices and CCPs 302-1, 302-2, 302-3 lie on the triangle edges (or the extension of edges). FIG. 3C also illustrates conics 300 which represent 3D lines.

Referring next to FIG. 4, an example method for MW reconstruction is shown. The steps illustrated in FIG. 4 may be performed by MW reconstruction module 120 (FIG. 1) from an XSlit image captured by XSlit camera 102. The steps illustrated in FIG. 4 represent an example embodiment of the present invention. It is understood that certain steps may be performed in an order different from what is shown.

At step 400, an XSlit image of a MW scene is captured. To reconstruct the MW scene, XSlit camera 102 is tilted such that slit apertures 206-1, 206-2 (FIG. 2A) are not parallel to the principle axes of planes (e.g., buildings) in the scene (to obtain XVPs and CCPs of different planes (e.g., different building faces). If slit apertures 206 are parallel to the principle axes, the CCP will not exist, and the line images will not be curved. In some examples, the captured image may be stored in storage 108 (FIG. 1).

At step 402, conics are fitted to line images (e.g., line image 300 in FIG. 3C) in the obtained XSlit image. At step 404, pairwise intersections of the conics are determined. As discussed above, the images of lines are hyperbolas as shown in equation 4, where coefficients A-F are uniquely determined by the XSlit camera intrinsic properties (that may be predetermined and are identical for all hyperbolas). The curve fitting scheme is applied by forming an overdetermined linear system of conic coefficients using the sampled points on the curves. A Singular Value Decomposition (SVD) is applied to solve for conic parameters $\tilde{A}$-$\tilde{F}$. An exemplary curve fitting scheme is described in Ding et al. ("Recovering Specular Surfaces Using Curved Line Images," CVPR 2009). To summarize the method, the conic parameters may be applied to a quadratic conic function and identify the intersection points identified from a quadratic equation formed by two conic functions.

At step 406, the XVPs and CCPs are identified from the pairwise intersection points. In addition to XVPs and CCPs, every two conics that correspond to two unparallel (i.e., not parallel) 3D lines may also intersect. Because their intersection point will not be shared by other conics, the intersections that only appear once may be removed to eliminate outliers.

All CCPs are located on the edges of a triangle determined by three XVPs. Therefore, three lines are fit using the rest of the intersections, and use the resulting triangle vertices (e.g., from points 304 in FIG. 3C) and edges (points 302) to separate the XVPs (points 304) from the CCPs (points 302). FIG. 3C illustrates this process for a simple scene composed of 18 lines 300 on 6 planes. Each plane has 3 parallel lines lying on it and the directions of all lines are aligned with the three principal axes.

At step 408, plane(s) are reconstructed from the XVPs and CCPs determined in step 406, based on equations 5-7. To reconstruct a MW scene from a single XSlit image, each CCP is mapped back to a plane (where every CCP corresponds to a unique 3D plane in the scene). Specifically, for each detected CCP, the CCP is combined with one of the XVPs 304 (triangle vertices) for computing the plane equations in equations 5 and 6.

At step 410, curve segments in the XSlit image are mapped to 3D line segments and used to truncate the plane(s) recovered in step 408. Each curve segment may be mapped back to a 3D line segment by intersecting the XSlit rays originated from the conic with the reconstructed plane. The endpoints of the line segments may be used for truncating the recovered planes. The plane equation defines an infinite plane. Because the 3D lines lie on the reconstructed plane, the length of the line determines the extent of the plane. The plane may be truncated to its actual size using the extent of the 3D line (or endpoints of a line segment).

At step 412, the recovered model may be rendered, to generate an image of the scene. The model recovered model may be rendered as a multi-perspective image and/or a perspective image.

It is contemplated that a non-transitory computer readable medium may store computer readable instructions for machine execution of the steps 402-412.

Referring next to FIGS. 5A-5D, an example real MW scene is reconstructed using XSlit camera 102 and MW reconstruction module 120 (FIG. 1). In the example shown in FIGS. 5A-5D, a lens camera (Sony NEX-5N) is used, where its lens is replaced with a pair of cylindrical lenses, each using two slit apertures as shown in FIG. 2A. In the example, an interchangeable lens camera was modified rather than a single lens reflex (SLR) camera, because the lens camera has a shorter flange focal distance (FFD), i.e., the distance between the sensor and the lens mount. For a 3D line to appear sufficiently curved, the line should span a large depth range with respect to the image plane. Thus it may be desirable to place the camera closer to the objects as well as to use lenses with a large field-of-view and a smaller focal length. The example XSlit camera uses two cylindrical lenses, one (closer to the sensor) with focal length 25 mm and the other lens with a focal length of 75 mm. To calibrate the XSlit camera, a pattern of five lines and an auxiliary perspective camera are used to determine line positions and orientations. Curve fitting is then conducted for recovering the XSlit intrinsics.

FIG. 5A illustrates an example MW scene. The scene is composed of parallel lines lying on two different planes, with a small figure placed between the two planes. The XSlit camera is tilted so that its two slits are not parallel to the lines in the scene.

FIG. 5B is an image of the MW scene shown in FIG. 5A, as captured by a perspective camera. When viewed by a perspective camera, the lines appear nearly identical. Although the lines intersect at a common vanishing point, it is difficult to tell if they belong to different planes.

FIG. 5C is an image of the MW scene shown in FIG. 5A, as captured by the example XSlit camera. In contrast to FIG. 5B, the lines for the two planes are different in the XSlit camera image. As shown in FIG. 5C, the lines exhibit different curviness and an observer can directly identify that the lines do not belong to the same plane.

FIG. 5D is an image illustrating MW reconstruction using the XSlit image (shown in FIG. 5C). Conic fitting and CCP/CVP detection methods are applied to the line images on XSlit image (described above with respect to FIG. 4). In the example, one XVP and two CCPs are identified and used to map the two recovered planes back onto the acquired XSlit image.

In summary, MW reconstruction processing (such as by MW reconstruction module 120) provides MW scene reconstruction via XSlit imaging (i.e., non-pinhole imaging). An XSlit Vanishing Point (XVP) and Coplanar Common Point (CCP) in the XSlit image may be used to group coplanar parallel lines. Each group of coplanar parallel lines intersect at an XVP and a CCP in their XSlit image and its geometry can be directly recovered from the XVP and CCP.

Rotational Stereo Matching

Stereo matching is an extensively studied problem in computer vision. It aims to extract 3D information by examining the relative position from two viewpoints, analogous to the biological stereopsis process. Current approaches use perspective view cameras under a translational motion. The second camera is translated away from the first camera, to have a sufficient camera baseline for producing parallax. Input images can be further rectified by being projected onto a common image plane to have purely horizontal parallax.

Referring to FIGS. 1A, 2C, 6A and 6B, XSlit camera 102 may be coupled to rotation module 114 and used to capture a rotational XSlit stereo image pair. The captured image pair may be used by rotational stereo matching module 122 to reconstruct a depth map of the scene. Thus, XSlit camera 102 may form stereo image pairs by fixing the position of each of imaging sensor 208, first slit lens 202-1 and second slit lens 202-2 (relative to optical axis 210), while switching the direction of each slit lens 202-1, 202-2 (see FIGS. 6A and 6B). The direction of slit lenses 202-1, 202-2 may be switched by rotating each of lenses 202-1, 202-2 (as illustrated in FIGS. 6A and 6B) or by rotating camera 118 (effectively rotating imaging sensor 208) by 90 degrees. For example, rotation module 114 may be used fix XSlit lens module 116 and rotate camera 118 relative to lens module 116 (shown in FIGS. 6C and 6D). In the description below, XSlit 1 refers to a first direction of slit lenses 202-1, 202-2 (i.e., prior to rotation) and XSlit 2 refers to a second (opposite) direction of slit lenses 202-1, 202-2 after rotation of lenses 202-1, 202-2 (via rotation of lenses 202 directly or via rotation of camera 118).

Thus, XSlit camera 102 may capture a stereo image pair by fixing the sensor/slit lenses locations (while switching the slit directions), instead of by camera translation. In some examples, XSlit lens module 116 may be mounted on commodity cameras and the slit direction changed via rotation module 114, in order to capture an R-XSlit pair.

A rotational XSlit camera 102 may be advantageous, because it may achieve "fixed-location" stereo by rotating only the slits, hence eliminating the need of placing two cameras at different spatial locations (as used in perspective stereo imaging). Rotational XSlit stereo image may be useful, for example, in surgical scenarios. For example, a single rotational XSlit camera may be used as an intrusive device for visualizing organs in 3D, a space that is typically not large enough to accommodate traditional translational stereo cameras (for them to function properly).

Referring to FIG. 7A, an epipolar geometry of a rotational XSlit image pair is described. For the rotational stereo model, two image planes $\pi_{uv}$ and $\pi_{st}$ are chosen that are parallel to both slits but which contain neither slits. Both slits are orthogonally projected on $\pi_{uv}$ and the intersection point is used as the origin of the coordinate system. The [u, v, σ, τ] parameterization is used, where σ=s−u and τ=t−v. Image plane $\pi_{uv}$ is selected as the default image (sensor) plane so that (u, v) can be directly used as the pixel coordinate and (σ, τ, 1) can be viewed as the direction of the ray. It is assumed that the two slits, $l_1$ and $l_2$, lie at $z=Z_1$ and $z=Z_2$ and have angle $\theta_1$ and $\mu_2$ with respect to the x-axis, where $Z_2>Z_1>0$ and $\theta_1\neq\theta_2$. Therefore, each XSlit camera 102 (i.e., before and after rotation) can be represented as $C(Z_1, Z_2, \theta_1, \theta_2)$. Each pixel (u, v) in C maps to a ray with direction (σ, τ, 1) (see Appendix A) as:

$$\begin{cases} \sigma = (Au + Bv)/E \\ \tau = (Cu + Dv)/E \end{cases} \quad (8)$$

where $A = Z_2 \cos\theta_2 \sin\theta_1 - Z_1 \cos\theta_1 \sin\theta_2,$ $B = (Z_1 - Z_2)\cos\theta_1 \cos\theta_2, C = (Z_1 - Z_2)\sin\theta_1 \sin\theta_2,$ $D = Z_1 \cos\theta_2 \sin\theta_1 - Z_2 \cos\theta_1 \sin\theta_2, E = Z_1 Z_2 \sin(\theta_2 - \theta_1)$ A rotational XSlit camera pair may be represented as two XSlit cameras, where XSlit 1: $C(Z_1, Z_2, \theta_1, \theta_2)$ and XSlit 2: $C'(Z_1, Z_2, \theta_2, \theta_1)$. In other words, the pair of slits switch their directions as shown in FIG. 7A.

Epipolar geometry refers to the geometry of stereo vision. In general, when two cameras view a 3D scene from two distinct positions, there are a number of geometric relations between the 3D points and their projections onto the 2D images that lead to constraints between the image points. In general, three varieties of epipolar geometry exist: planes, hyperboloids and hyperbolic-paraboloids. If epipolar geometry exists, there should exist a curve in $C'(Z_1, Z_2, \theta_2, 0)$ where all rays originating from the curve intersect with $\vec{r}_0$.

The inventors have determined that the rotational XSlit camera pair form a valid epipolar geometry, such that epipolar curves of the form:

$$\sin\theta\cdot uv - \cos\theta\cdot v^2 = \kappa \quad (9)$$

Exist in both XSlit cameras (i.e., before and after rotation of XSlit camera 102), where κ is a constant.

Equation 9 shows that, different from perspective stereo, epipolar lines in a rotational XSlit camera pair are of hyperbola form. The search space of correspondences between each image in the stereo image pair, however, is still effectively reduced to one-dimension (1D).

FIG. 7B shows a stereo image pair of a portion of a kitchen scene. Image 700-1 is a first image of the scene with slit lenses 202-1, 202-2 in a first position. Image 700-2 is a second image of the scene with slit lenses 202-1, 202-2 switched to opposite positions (i.e., a second position) (by rotating slit lenses 202-1, 202-2 or by rotating camera 118). An epipolar curve 702 is located and plotted on each image 700. The correspondence 704 between feature points along respective epipolar curves 702-1, 702-2 is also shown.

Disparity is used in stereo vision to determine object depth. Typically, images are compared. The two images are shifted together over each other to find the parts that match. The shifted amount is called the disparity. In general, the disparity depends on object depth, is a monotonic function in object depth and may be used to locate the corresponding pixel in the second view.

In current perspective stereo matching schemes, disparity is defined as a horizontal parallax. However, in a rotational XSlit image pair, because the epipolar curves are hyperbolas, corresponding pixels exhibit both vertical parallax and horizontal parallax. The rotational XSlit image pair disparity ($d^{xs}$) is defined as:

$$d^{xs} = \frac{v'}{v} = \frac{Z_2}{Z_1} \cdot \frac{z - Z_1}{z = Z_2} \quad (10)$$

Thus, given a pixel ($u_p, v_p$) in C and its disparity $d_p^{xs}$ with respect to C', the corresponding pixel p' in C' may be determined. Specifically, $v'_p = v_p \cdot d_p^{xs}$ may be determined and then the epipolar curve may be used to determine $u'_p = (\cos\theta\cdot v'_p)/\sin\theta + \kappa/(\sin\theta\cdot v'_p)$, where $\kappa = \sin\theta\cdot u_p v_p - \cos\theta\cdot v_p^2$.

In perspective cameras, the singularity of disparity occurs when scene points lie on the line connecting the two centers of projection (CoP)s, i.e., rays from the two cameras become identical. From equation (10), an rotational XSlit image pair has singularity at v=0 where disparity can no longer be computed. In reality, v=0 implies that the epipolar geometry still exists and it corresponds to the y=0 plane. In that case, the disparity is redefined as $d^{xs}=u/u'$, which is consistent with v'/v when y=0. The real singularity is when x=y=0, i.e., the ray aligns with the z-axis, which is the only ray shared by both XSlit cameras.

To recover depth from the rotational XSlit image pair, the graph-cut algorithm may be used, by modeling stereo matching as XSlit disparity labeling. Specifically, the disparity $d^{xs}$ (equation (10)) may be discretized to M labels (where M is an integer). Given a label $d_i^{xs}$, i∈[1,M] to a pixel p in C, its corresponding pixel $p'=d_i^{xs}(p)$ in C' may be determined as described above. The energy function E of assigning a label $d_i^{xs}$ to a pixel p in C is identical to the one used in perspective stereo matching and may be represented as:

$$E(d_i^{xs}) = \alpha \cdot \sum_{p \in P} E_d(p, d_i^{xs}(p)) + \sum_{p_1, p_2 \in N} E_s(p_1(d_i^{xs}), p_2(d_j^{xs}))$$

where P is the set of all pixels in C, N represents the pixel neighborhood, and the non-negative coefficient α balances the data term $E_d(p)\|I(p)-I'(d_i^{xs}(p))\|$ and the smooth term $E_s$. The terms I(p) and I'(p) refer to the pair of rotational XSlit images.

Once the disparity map is recovered, the object depth z may be determined by inverting Eqn. (10) as $$z = Z_2\left(1 + \frac{Z_2 - Z_1}{Z_1 d^{xs} - Z_2}\right) \quad (11)$$

Equation (11) applies to pixels both on and off the v-axis.

The pixel-wise comparison of the data term can be sensitive to camera alignment and image noise. It may be desirable to compare patch similarity to improve robustness (as opposed to a pixel-wise comparison. Different from perspective stereo, image patches in an XSlit image are distorted (e.g., sheared and/or stretched), where the distortion is determined by the slit position/direction and object depth. To perform stereo matching, distortion in the XSlit image pair are first corrected and then patch similarity is measured.

Referring next to FIG. 8, an example method for rotational stereo matching is shown. The steps illustrated in FIG. 8 may be performed by rotational stereo matching module 122 (FIG. 1), from a pair of XSlit images captured by XSlit camera 102, in combination of with rotation module 114. The steps illustrated in FIG. 8 represent an example embodiment of the present invention. It is understood that certain steps may be performed in an order different from what is shown.

At step 800, a first XSlit image of a scene is captured by XSlit camera 102, with slit lenses 202-1, 202-2 positioned in a first direction (as shown in FIGS. 6A and 6C). The first XSlit image may be stored in storage 108. At step 802, camera 118 (FIG. 1) and/or slit lenses 202-1, 202-2 are rotated by 90 degrees via rotation module 114 (as shown in FIGS. 6B and 6D), such that slit lenses 202-1, 202-2 are positioned in a second direction opposite the first direction. At step 804, a second XSlit image of the scene is captured by XSlit camera 102 with lenses 202 in the second direction (responsive to step 802). The second XSlit image may also be stored in storage 108. The first and second XSlit images represent a rotational XSlit image pair.

At step 806, epipolar curves may be located in each of the first and second XSlit images, for example, based on equation (9). To locate the epipolar curves, equation (9) may be used. By selecting a value for κ (e.g., κ=2), a set of epipolar curves may be obtained in corresponding first and second XSlit images.

At step 808, each of the first and second image is divided into patches of m×n pixels. In one example, each patch size is 5×5 pixels. The patch size is selected small enough such that the depth value is substantially constant within each patch.

At step 810, distortion is corrected in each patch of each of the first and second images. Because distortion in an XSlit image may include shearing and stretching, the distortion correction includes un-shear the patches and then resizing the patches such that the patches have the same aspect ratio.

When assigning a disparity label $d_i^{xs}$ to a pixel in camera C, the patches are first sheared in each XSlit view with a shear matrix $$\begin{bmatrix} 1 & 0 \\ s & 1 \end{bmatrix},$$

where s is the shear factor. For C, $$s = \frac{\cos\theta}{\sin\theta} \cdot \frac{z_i(Z_1 - Z_2)}{Z_1(z_i - Z_2)};$$

and for C', $$s' = \frac{\cos\theta}{\sin\theta} \cdot \frac{z_i(Z_2 - Z_1)}{Z_2(z_i - Z_1)},$$

where $z_i$ is the scene depth corresponding to $d_i^{xs}$.

Next, the aspect ratio distortion is corrected. For a scene point at depth $z_i$, its aspect ratio in C may be determined as $$\frac{Z_2(z_i - Z_1)}{Z_1(z_i - Z_2)}$$

and in C' as $$\frac{Z_1(z_i - Z_2)}{Z_2(z_i - Z_1)}.$$

By equation (10), the aspect ratio is identical to the disparity $d_i^{xs}$ corresponding to $z_i$. Therefore, $d_i^{xs}$ may be used directly as the scaling factor. Assume the original image resolutions are m×n in C and n×m in C', the first image (of the image pair) is resized to $d_i^{xs}$ m×n and the second image (of the image pair) is resized to n×$d_i^{xs}$ m.

At step 812, a patch similarity (after distortion correction in step 810) is measured along the epipolar curves (step 806). Thus, patches of the same size may be queried from the resized results (step 810) for determining the patch similarity. To accelerate the process, the input image pairs may be pre-scaled with different disparity labels (and stored in storage 108 (FIG. 1)). Pre-scaled patches having a specific disparity label may be then be retrieved from storage 108 and used to determine the patch similarity. The patch similarity may be measured by an averaged intensity. The similarity value provides a penalty term when assigning depth labels to each patch. For example, given two patches, their similarity may be determined in terms of the average intensity/color difference over all corresponding pixels. The difference may be measured in either $L_1$ norm or $L_2$ norm.

At step 814, the depth map is reconstructed by incorporating the similarity measure into any suitable stereo matching algorithm, such as, without being limited to, graph-cut, edge-based, coarse-to-fine, adaptive windows, dynamic programming, Markov random fields, and multi-baseline techniques.

It is contemplated that a non-transitory computer readable medium may store computer readable instructions for machine execution of the steps 806-814.

Referring to FIGS. 9A-9E, an example rotational stereo matching result for a scene is described. The R-XSlit pair is P(1.0, 1.5, 105°) where 1.0 represents the distance of slit lens 202-2 to imaging sensor 208, 1.5 represents the distance of slit lens 202-1 to imaging sensor 208 and 105° represents the angle between slit lenses 202-1, 202-2. In particular, FIGS. 9A and 9B are a pair of input XSlit images including a ground truth map (shown in FIG. 9A); FIG. 9C is a recovered disparity may for pixel-based matching using graph-cut; FIG. 9D is a recovered disparity map for patch-based matching with distortion correction; and FIG. 9E is a recovered disparity map for patch-based matching without distortion correction.

The images are synthesized using a POV-Ray ray tracer (www.povray.org) with a general XSlit camera model. The scene has depth range of [6, 35]. Gaussian noise of $\sigma=0.05$ is added to the rendered XSlit images. The pixel-based result (FIG. 9C) lacks smoothness and includes image noise. In contrast, the patch-based result without distortion correction (FIG. 9E) produces large errors.

In one example, slit lenses 202-1, 202-2 (FIG. 6A) may be positioned such that they are orthogonal and axis-aligned. This is also referred to as a parallel orthogonal XSlit (PDXSlit) camera. When slit lenses 202-1, 202-2 are arranged to form a PDXSlit camera, the epipolar curves become uv=κ. Images of a PDXSlit camera may appear similar to perspective camera, with fewer distortions.

Referring next to FIGS. 10A-10G, the rotational stereo matching approach (FIG. 8) is used on a scene acquired with a rotational PDXSlit camera 102. In particular, FIG. 10A illustrates an experimental setup for an indoor scene composed of about five depth layers. The scene is captured twice (first as XSlit1 and then as XSlit 2 by rotating the camera 102 by 90 degrees on rotation ring 114), to generate the rotational PDXSlit image pair. The two XSlit images are captured at a resolution of 2448×1376 and down-sampled to half of their original resolution. The position of the two slit lenses with respect to imaging sensor 208 are $Z_1=38$ mm and $Z_2=66$ mm.

The slit apertures 206-1, 206-2 each have width of 2 mm. FIGS. 10B and 10C illustrate the captured first and second rotational XPOSlit images.

Rotation of the ring does not guarantee that the optical axis 210 (i.e., the central ray) is perfectly aligned. However, the distortion-corrected patch-based graph-cut algorithm may be applied to recover a disparity map from the PDXSlit image pair.

This is analogous to conducting stereo matching on perspective image pairs that are slightly misaligned. Misalignment may lead to inaccurate depth maps, although the recovered disparity map can still reveal meaningful scene structures.

Figure 10D:
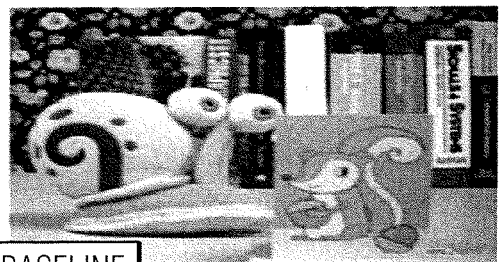
Figure 10E:
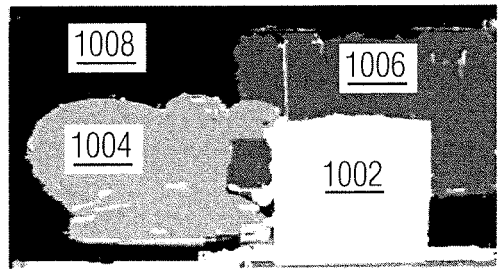
Figure 10F:
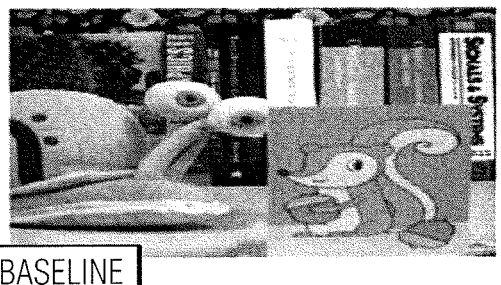
Figure 10G:
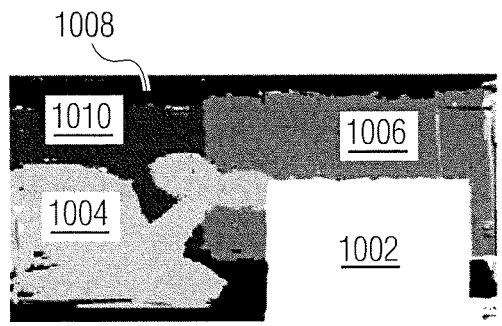

FIGS. 10D and 10F are images illustrating stereo matching results given the PDXSlit image pair (FIGS. 10B and 10C) for a small baseline (1.7) and a large baseline (2), where the baseline is defined as $Z_2/Z_1$. FIGS. 10E and 10G are recovered disparity maps corresponding to FIGS. 10D and 10F.

In this example, the disparity label is discretized into 20 levels at range of [1.8, 2.3] patch-based stereo matching is applied. In FIGS. 10D and 10E, a relatively small XSlit baseline (1.7) is used. As a result, the maximum resolvable depth is relatively small and the depth error is relatively large. The process is able to distinguish depth layers 1002, 1004 and 1006. However, it is unable to distinguish a computer graphics book and the patterned background.

Referring to FIGS. 10F and 10G, the XSlit baseline is increased to 2, by adjusting $Z_2$ to 76 mm with the same $Z_1$ being fixed. By increasing the baseline, the maximum resolvable depth is increased and the depth errors may be reduced. FIG. 10G shows that the background and the book are now separately detected as two layers (respective layers 1008 and 1010). The new R-PDXSlit images, however, have a narrower field-of-view. Further, the images exhibit stronger distortions, e.g., FIG. 10F is more horizontally stretched than FIG. 10D.

Coded Aperture Imaging

Recent advances in computational imaging and photography have enabled many new solutions to tackle traditionally challenging computer vision problems. A notable class of solutions is coded computational photography. By strategically blocking light over time, space, wavelength, etc., coded computational photography may facilitate scene reconstruction and may preserve image quality. For example, a coded aperture technique, which was initially developed in astronomy and X-ray imaging, has been extended to commodity cameras. In current cameras, a coded pattern correlates the frequency characteristics of defocus blurs with scene depth to enable reliable deconvolution and depth estimation.

Current coded aperture systems are formed on commodity cameras equipped with a spherical thin lens and a circular aperture. Spherical lenses may effectively emulate pinhole projection when the aperture is small. This model also facilitates easy analysis of the depth-of-field in terms of aperture size and object distance. To implement a coded aperture, it is common practice to replace the circular aperture with the desired coded patterns.

Referring to FIG. 1, imaging system 100 may perform coded aperture imaging via coded aperture imaging module 124 using an XSlit image from XSlit camera 102. As discussed above, geometrically, XSlit lens camera 102 collects light rays that simultaneously pass through XSlit lens module 116 (including two oblique or orthogonal slits in 3D space). XSlit lens module 116 produces a different and potentially advantageous depth-of-field (DoF) than a spherical lens. Specifically, when the two types of lenses have a similar throughput, XSlit lens module 116 exhibits a better DoF.

Referring to FIG. 13A, a perspective view diagram of portions of XSlit camera 102 is shown. FIG. 13A illustrates the positions of first and second lenses 204-1, 204-2 with respect to imaging sensor 208. FIG. 13A also illustrates an example of the transformation of a light ray ($r_i$) through lenses 204-1, 204-2. Although FIG. 13A illustrates first cylindrical lens 204-1 as orthogonal to second cylindrical lens 204-2, lenses 204-1, 204-2 may also be arranged at an oblique angle. Thus, the coded aperture imaging process described below, with respect to an orthogonal arrangement of cylindrical lenses 204, may also be performed with cylindrical lenses 204 arranged at an oblique angle.

In FIG. 13A, first cylindrical lens 204-1 is positioned at a distance $z=l_1$ from imaging sensor 208. Second cylindrical lens 204-2 is positioned at a distance $z=l_2$ from imaging sensor 208, where $l_1>l_2$. First cylindrical lens 204-1 and second cylindrical lens 204-2 have respective focal lengths of $f_1$ and $f_2$. First cylindrical lens 204-1 and second cylindrical lens 204-2 also have respective rectangular-shaped apertures (e.g., as shown in FIG. 2A) with respective widths of $w_1$ and $w_2$.

The aperture of a lens may introduce defocus blurs and reduce the DoF. The defocus blur may be determined from a point spread function (PSF), also referred to as a blur kernel. The inventors have determined that the PSF (blur kernel) of XSlit camera 102 (also referred to as an XSlit PSF) may be represented as:

$$PSF(x, y) = \begin{cases} 1 & |x| \le \frac{w_2}{2}\left(\frac{z}{z-l_2} - \frac{l_2}{f_2}\right) \text{ and } |y| \le \frac{w_1}{2}\left(\frac{z}{z-l_1} - \frac{l_1}{f_1}\right) \\ 0 & \text{else} \end{cases} \quad (12)$$

An example PSF is shown in FIG. 11 and FIG. 11A-11D. FIG. 11 represents XSlit PSFs captured at different depths. FIGS. 11A-11D represent the highlighted portions shown in FIG. 11, taken from left-to-right of FIG. 11. An XSlit camera 102 with focal length 50 mm and 50 mm was used to capture a 32×24 dot-array projected on a slanted screen (ranging from 15 cm to 36 cm with respect to the camera). As shown in FIGS. 11A-11D, the XSlit PSFs vary both in shape and scale with respect to depth. Thus, the XSlit PSF is non-isotropic and its shape is depth dependent.

Based on a DoF analysis of XSlit camera 102, a coded aperture pattern for coded pattern imaging may be determined. Developing coded patterns is challenging: an ideal pattern may have to have two conflicting properties, i.e., a reliable deconvolution and a high depth discrepancy. It is desirable that the aperture code pattern be broadband to ensure robust deconvolution. It is also desirable for the aperture code pattern to contain many zero crossings in the frequency domain, to distinguish different depth layers. XSlit lens module 116 encodes the one of slit lenses 202 (FIG. 2A) with the smaller dimension (i.e., slit lens 202-2) using slit aperture 206-2' with broadband codes and encodes the other slit lens (i.e., slit lens 202-1) using slit aperture 206-1' with high depth discrepancy codes.

Referring next to FIG. 12, an example method for coded aperture imaging is shown. The steps illustrated in FIG. 12 may be performed by coded aperture imaging module 124 (FIG. 1), from an XSlit image captured by XSlit camera 102, using coded apertures 206-1', 206-2' (FIG. 2A). The steps illustrated in FIG. 12 represent an example embodiment of the present invention. It is understood that certain steps may be performed in an order different from what is shown.

At step 1200, a 1D coded aperture 206-1' with a high depth discrepancy code is applied to first cylindrical lens 204-1 (FIG. 2A). At step 1202, a 1D coded aperture 206-2' with a broadband code is applied to second cylindrical lens 204-2.

Depth recovering using coded aperture has been explored on spherical lenses. The basic idea is to analyze the coded pattern and defocused images to recover scene depth and produce an all-focus image. However, designing the code is a difficult. To discriminate depth, the aperture pattern desirably includes zero-crossings in the frequency domain to purposely introduce variations among blurry images in terms of depths. However, to ensure robust deconvolution, the aperture pattern is desirably broadband, i.e., its frequency profile should have few zero-crossings.

From DoF analysis of XSlit camera 102, XSlit lens module 116 exhibits less horizontal blurs and approximately the same vertical blurs under the same light throughput as a throughput equivalent spherical lens (TESL). Thus, first cylindrical lens 204-1 (i.e., the horizontal lens) is encoded using the high discrepancy kernel and vertical cylindrical lens 204-2 is encoded with the broadband kernel. Based on the selected coded aperture, XSlit lens module 116 provides the same depth discrepancy as its TESL (because they have identical vertical blur scale), whereas the other dimension is less blurred and provides more robust deconvolution. When the coding scheme is switched (i.e., by applying the broadband pattern to first cylindrical lens 204-1 and by applying the high depth discrepancy pattern to second cylindrical lens 204-2), although the all-focus image may be more easily restored, the depth discrimination ability is reduced.

Next an example of selecting an appropriate coded pattern for each cylindrical lens 204-1, 204-2 is described. It is assumed that the vertical pattern is $K_v(x)$ and the horizontal pattern is $K_h(y)$. The overall blur kernel is therefore $K(x, y) = K_v(x) \cdot K_v(y)$ where x and y are further constrained by the close-form PSF (equation 12). For each 1D pattern, a code from a series of randomly sampled 13-bit codes is chosen. Because the vertical code $K_v$ is a broadband code, a code is selected whose minimal amplitude value in the frequency domain is maximal.

Then, $K_v$ is fixed and the optimal $K_h$ is determined. It is assume that the blur kernel at depth i is $K^i = K_v^i \cdot K_h^i$. To improve the depth discrepancy, it is desirable to maximize the distance between blurry image distributions caused by kernels at different depths, i.e., $K^i$ and $K^j$ ($i \ne j$). The commonly used Kullback-Leibler (KL) divergence is used to measure the distance between two blurry image distributions as:

$$D(P^i(y), P^j(y)) = \int_y P^i(y)(\log P^i(y) - \log P^j(y)) dy \quad (13)$$

where $P^i$ and $P^j$ are the blurry image distribution for $K^i$ and $K^j$ respectively and the hyper-Laplacian distribution of natural images is used for computing $P^i$ and $P^j$.

In one example, "1010010011111" is selected as the vertical code and "110011110011" is selected as the horizontal code. The power spectra of these two selected codes are shown in FIG. 13B. In FIG. 13B, curve 1302 is the power spectrum of the high depth discrepancy code and curve 1304 is the power spectrum of the broadband code.

At step 1204, an XSlit image of the scene is captured by XSlit camera 102 using the coded apertures 206-1', 206-2' applied in steps 1200 and 1202. In some examples, the captured image may be stored in storage 108 (FIG. 1).

At step 1206, a plurality of PSFs are generated corresponding to a respective plurality of depth layers. To estimate depth, a corresponding PSF may be pre-calculated for each depth layer using the coded pattern and the closed-form PSF (equation 12).

At step 1208, one of the pre-calculated PSFs is selected from among the plurality of PSFs that results in an optimal shape image (one with minimal ringing). Specifically, deconvolution is performed between the captured XSlit image and the pre-calculated PSFs of different depth layers. When the PSF scale is larger than the actual scale, the result will exhibit strong ringing artifacts. When the scale is smaller than the actual scale, the image may appear less sharp but does not exhibit ringing.

A Gabor filter may be used to detect ringing in the deconvolved image, where increasing responses correspond to more severe ringing. A Gabor filter is a Gaussian kernel function modulated by a sinusoidal plane wave and can be written as:

$$G_{\lambda,\theta}(x, y) = \exp\left(-\frac{x'^2 + \gamma y'^2}{2\sigma^2}\right) \cos\left(2\pi \frac{x'}{\lambda}\right) \quad (14)$$

where $x'=x \cos \theta - y \sin \theta$, $y'=x \sin \theta - y \cos \theta$, $\lambda$ is the wavelength (reciprocal of the spatial frequency), $\theta$ is the orientation of the filter, $\gamma$ is the aspect ratio, and $\sigma$ is the standard deviation of a Gaussian distribution.

In one example, Gabor filters with $\theta=0°$ and $90°$ are used for ringing detection. The response $R_\theta$ of Gabor filter $G_\theta$ is defined as:

$$R_\theta(x,y) = \iint I(x,y) G_\theta(x-u, y-v) du dv \quad (15)$$

where $I(x,y)$ represents the XSlit image.

The horizontal and vertical Gabor responses on each deconvolved image are summed, and the response with smallest value corresponds to the optimal depth. The scene may be discretized to N depth layers and the graph-cut algorithm may be reused for the assigned depth labels. The Gabor response is used as a penalty term for building the graph. Therefore, the energy function E of assigning a depth label $d_i$ to a pixel p is formulated as:

$$E(d_i) = \alpha \cdot \sum_{p \in P} E_d(p, d_i(p)) + \sum_{p_1, p_2 \in N} E_s(p_1(d_i), p_2(d_j)) \quad (16)$$

where P represents all pixels in the image; N represents the pixel neighborhood; $E_d(p,d_i(p))$ is the Gabor response as the data term; $E_s$ is the smooth term; and the non-negative coefficient $\alpha$ balances the data term $E_d$ and the smooth term $E_s$.

At step 1210, the depth of the scene may be reconstructed based on the selected PSF (step 1208). In one example, to recover an all-focus image, because the blur kernel only includes 1D scene information, the modified Wiener deconvolution is reused with natural image priors. This technique may be faster than an Iteratively Reweighted Least Squares (IRLS) deconvolution that can handle kernels with many zero crossings. Because the blur kernel (PSF) is known (and is a function of depth), once the kernel size is determined, the depth may be determined from the blur kernel size.

It is contemplated that a non-transitory computer readable medium may store computer readable instructions for machine execution of the steps 1206-1210.

Figure 14O:

Next, Referring to FIGS. 14A-14O, an example of coded aperture imaging for scene reconstruction with XSlit camera 102 is described. In particular, FIG. 14D is a ground truth image of a synthetic scene; FIGS. 14A-14C are TESL and XSlit coded aperture images; FIGS. 14E-14H are example depth map images for the coded aperture and ground truth images shown in respective FIGS. 14A-14D; FIGS. 14I-14K are example resulting de-blurred images based on the respective TESL and XSlit coded aperture images shown in FIGS. 14A-14C; and FIGS. 14L-14O illustrate portions of the images shown in respective FIGS. 14D, 14I, 14J and 14K.

FIG. 14D represents a simple scene with three depth layers at 20 cm, 40 cm and 80 cm. XSlit lens module 116 is configured to focus at 16 cm and 24 cm. The TESL's focal plane coincides with the front focal plane of the XSlit. For the TESL, a coded pattern is used which is expected to have high depth discrepancy. For XSlit lens module 116, high depth discrepancy and broadband codes are used.

FIGS. 14A-14O shows the recovered depth map and all-focus image using the two lenses. For image deconvolution, IRLS (first column) and Wiener filters (the other two columns) are applied. Coded aperture result on the TESL using the selected code produces a high quality depth map, although the recovered all-focus image exhibits ring artifacts near occlusion boundaries due to zero-crossings in the frequency domain. XSlit lens module 116 with the coded apertures is able to reduce the ringing artifacts because of smaller horizontal PSFs. The XSlit coding scheme and its recovered depth map is comparable to that of the TESL.

Although the invention has been described in terms of methods and systems for capturing and processing images, it is contemplated that one or more steps and/or components may be implemented in software for use with microprocessors/general purpose computers (not shown). In this embodiment, one or more of the functions of the various components and/or steps described above may be implemented in software that controls a computer. The software may be embodied in non-transitory tangible computer readable media (such as, by way of non-limiting example, a magnetic disk, optical disk, hard drive, etc.) for execution by the computer. As described herein, devices 104, 106, 110 and 112, shown in FIG. 1, may perform certain operations using dedicated circuitry and/or using software contained in a computer-readable medium 108 coupled to controller 104. The software instructions may cause controller 104 and/or image processing module 106 to perform one or more processes described herein. Alternatively, hardwired circuitry may be used in place of, or in combination with, software instructions to implement processes described herein. Thus, implementations described herein are not limited to any specific combination of hardware circuitry and software.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for reconstructing a scene, the method comprising the steps of:
   directing light representing the scene through a lens module coupled to an imaging sensor, the lens module including: first and second cylindrical lenses positioned along an optical axis of the imaging sensor, the first and second cylindrical lenses each having a respective cylindrical axis, first and second slit-shaped apertures disposed on the respective first and second cylindrical lenses such that the first slit-shaped aperture extends along the cylindrical axis of the first cylindrical lens and the second slit-shaped aperture extends along the cylindrical axis of the second cylindrical lens, the cylindrical axis of the second cylindrical lens not parallel with the cylindrical axis of the first cylindrical lens;
   capturing, by the imaging sensor, the light directed through the lens module to form at least one multi-perspective image; and
   processing, by a processor, the at least one multi-perspective image to determine a reconstruction characteristic of the scene.

2. The method according to claim 1, wherein the processing of the at least one multi-perspective image includes:
   identifying at least one plane in the scene from the at least one multi-perspective image, based on identification of a coplanar common point and a vanishing point within the at least one multi-perspective image.

3. The method according to claim 2, the method further including:
   fitting conics to one or more line images in the at least one multi-perspective image;

determining a pair-wise intersection of the conics to identify the coplanar common point and the vanishing point; and reconstructing the at least one plane based on the coplanar common point and the vanishing point.

4. A system comprising:

a camera configured to capture at least one multi-perspective image of a scene, the camera including:

a lens module coupled to an imaging sensor, the lens module including: first and second cylindrical lenses positioned along an optical axis of the imaging sensor, the first and second cylindrical lenses each having a respective cylindrical axis, first and second slit-shaped apertures disposed on the respective first and second cylindrical lenses such that the first slit-shaped aperture extends along the cylindrical axis of the first cylindrical lens and the second slit-shaped aperture extends along the cylindrical axis of the second cylindrical lens, the cylindrical axis of the second cylindrical lens not parallel with the cylindrical axis of the first cylindrical lens; and an image processing module configured to receive the captured at least one multi-perspective image of the scene and to determine a reconstruction characteristic of the scene.

5. The system according to claim 4, wherein the angle is greater than or equal to 90 degrees and less than 180 degrees.

6. The system according to claim 4, wherein the image processing module is configured to identify at least one plane in the scene from the at least one multi-perspective image, based on identification of a coplanar common point and a vanishing point within the at least one multi-perspective image.

7. A multi-perspective camera comprising:

an imaging sensor; and a lens module coupled to the imaging sensor, the lens module comprising:

a first cylindrical lens and a second cylindrical lens each positioned along an optical axis of the imaging sensor, the first and second cylindrical lenses each having a respective cylindrical axis, the cylindrical axis of the second cylindrical lens not parallel with the cylindrical axis of the first cylindrical lens; and a first slit-shaped aperture and a second slit-shaped aperture disposed on the respective first cylindrical lens and the second cylindrical lens such that the first slit-shaped aperture extends along the cylindrical axis of the first cylindrical lens and the second slit-shaped aperture extends along the cylindrical axis of the second cylindrical lens, wherein the imaging sensor is configured to capture a multi-perspective image of a scene.

8. The multi-perspective camera according to claim 7, wherein the angle is greater than or equal to 90 degrees and less than 180 degrees.

* * * * *